United States Patent [19]

Zdvorak, Sr.

[11] Patent Number: 5,960,625
[45] Date of Patent: Oct. 5, 1999

[54] CONSTANT VOLUME COMBUSTION TURBINE WITH PLURALITY FLOW TURBINE WHEELS

[76] Inventor: Edward H. Zdvorak, Sr., 8024 Rancho Fanita Dr., Santee, Calif. 92071

[21] Appl. No.: 09/137,623

[22] Filed: Aug. 21, 1998

[51] Int. Cl.[6] .................................. F02C 3/16; F02C 5/00
[52] U.S. Cl. .......................................... 60/39.34; 60/39.38
[58] Field of Search ................................. 60/39.34, 39.35, 60/39.38, 39.76, 247

[56] References Cited

U.S. PATENT DOCUMENTS

| 736,715 | 8/1903 | Gervais | 60/39.76 |
|---|---|---|---|
| 2,937,498 | 5/1960 | Schmidt | 60/39.38 |
| 3,417,564 | 12/1968 | Call | 60/39.38 |
| 3,611,720 | 10/1971 | Fehlau | 60/39.34 |
| 3,791,139 | 2/1974 | Simons . | |
| 3,811,275 | 5/1974 | Mastrobuono | 60/39.34 |
| 4,241,576 | 12/1980 | Gertz | 60/39.34 |
| 4,570,438 | 2/1986 | Lorenz . | |
| 4,620,414 | 11/1986 | Christ | 60/39.34 |
| 4,693,075 | 9/1987 | Sabatiuk . | |
| 5,237,811 | 8/1993 | Stockwell . | |

FOREIGN PATENT DOCUMENTS 1113611  9/1961  German Dem. Rep. .

*Primary Examiner*—Ted Kim

[57] ABSTRACT

A gas turbine engine having a turbine housing, air compressor, diffuser, shafts, bearings, seals, ignition system, fuel system and starter with improvements comprising an air charge combustor inlet plate (44), a rotating constant volume combustor (74), a gas metering valve plate (46), a gas distributor plate (102), gas nozzle plates (48), (104) and (112), and turbine wheels (66), (68) and (70); which enables changing pressures inherent to constant volume combustion, in combustion chambers (74E)–(74T), to simultaneously produce a plurality of initially separate, coaxial and annular, virtually continuous gas flow streams for efficiently converting combustion gas energy into useful work. The combustor (74), rotating very slowly relative to the speed of the main turbine shaft, with individual combustion chambers (74E)–(74T) equally spaced circumferentially about the center of rotation, provides sufficient time for complete combustion, supplying gas metering valve plate (46) and gas distributor plate (102) with gases at predetermined pressure steps for a high production rate of high frequency, coaxial, annular gas streams driving turbine wheels (66), (68) and (70) juxtaposed coaxially with paired nozzles plates (48), (104) and (112). The turbine wheels and the nozzle plates incorporate conventional axial flow blades and nozzle vane air foils, but said vanes and blades are arranged in a plurality of radially displaced concentric patterns with circular separators for accommodating a plurality of annular gas streams. After passing through the nozzle plates and the turbine wheels, spent gas streams merge into predetermined equal temperature, equal pressure and equal velocity confluence zones and exhaust to atmosphere. The turbine assembly provides short and smooth passages for the air and gas processes. Alternate embodiments include a different number of turbine wheels and nozzle plates, and other embodiments incorporate optional features similar to existing technology equipment and heat recovery cycles.

11 Claims, 11 Drawing Sheets

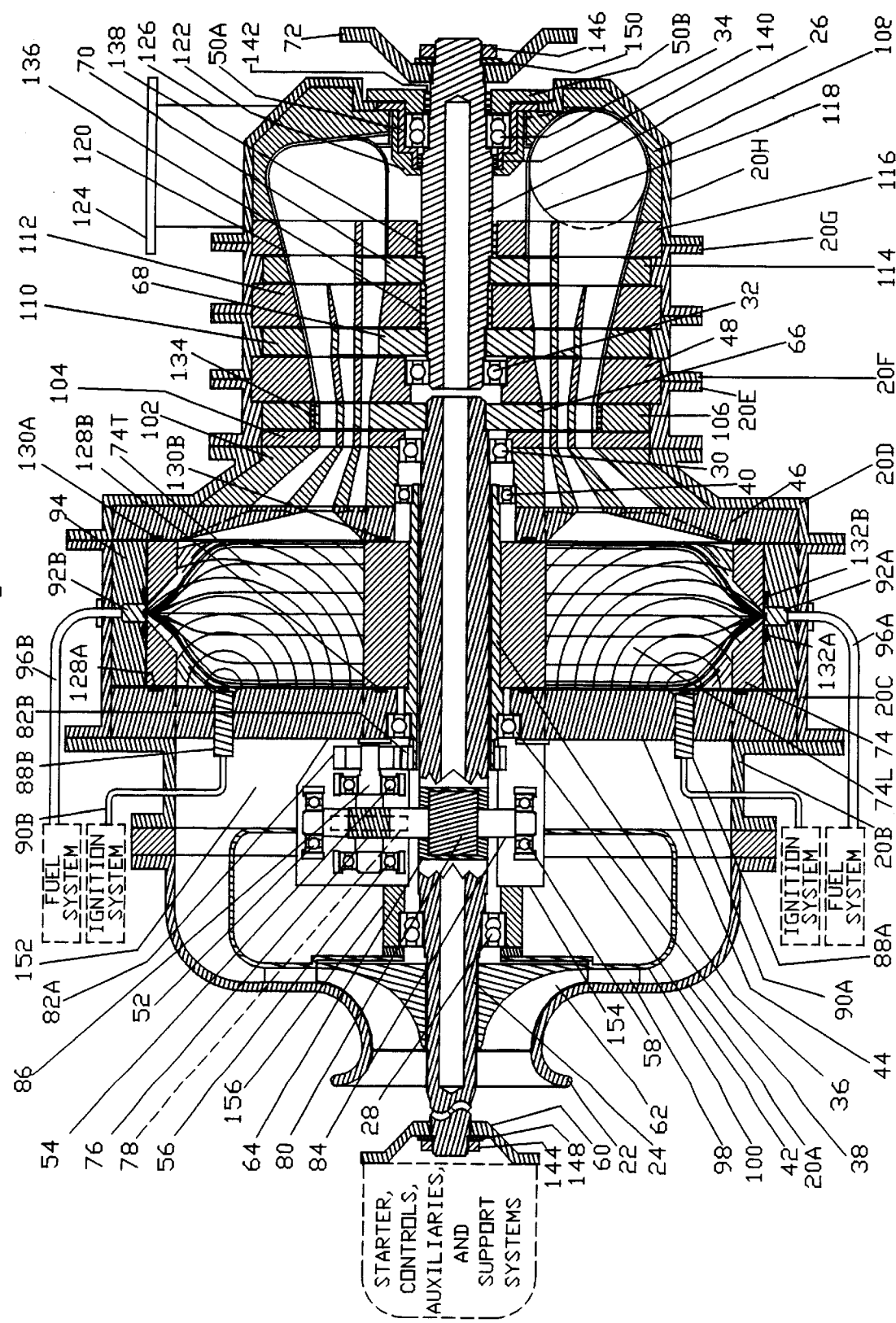

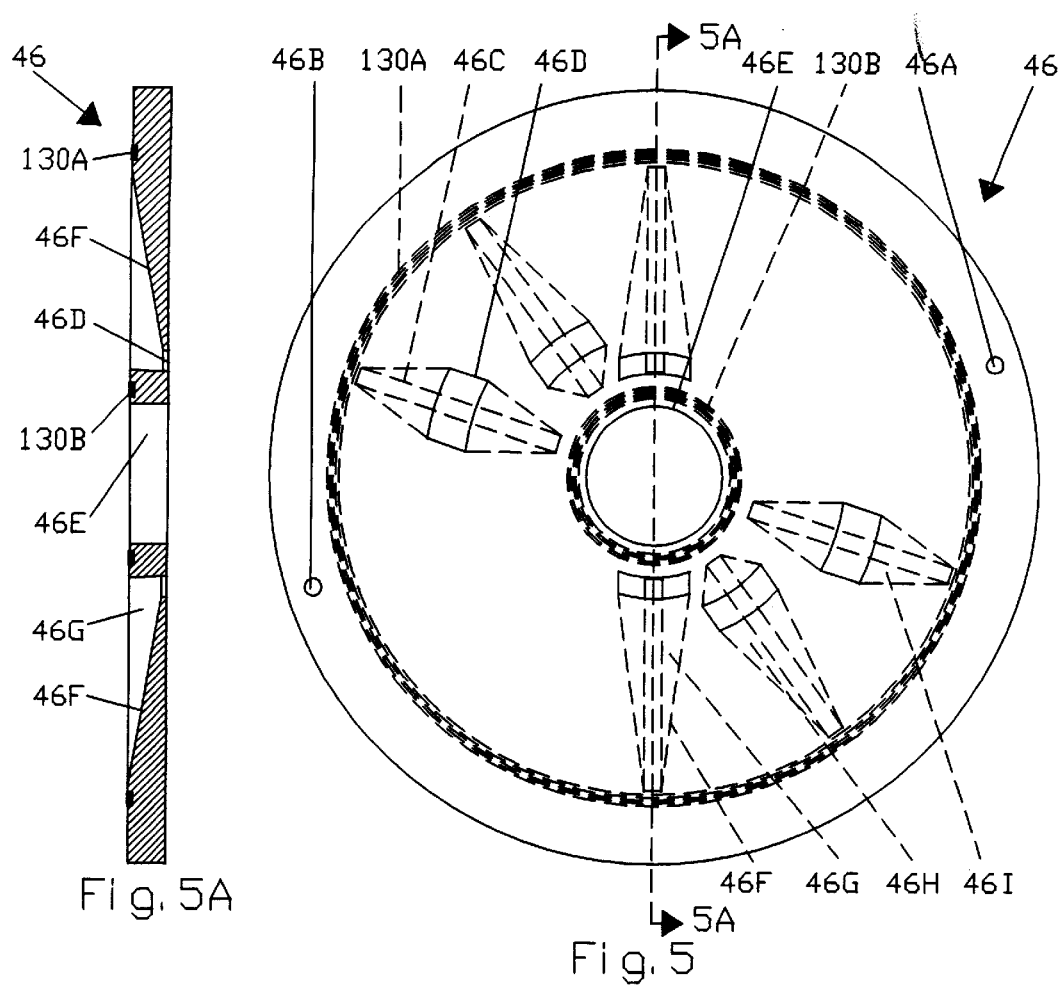
Fig. 5A
Fig. 5
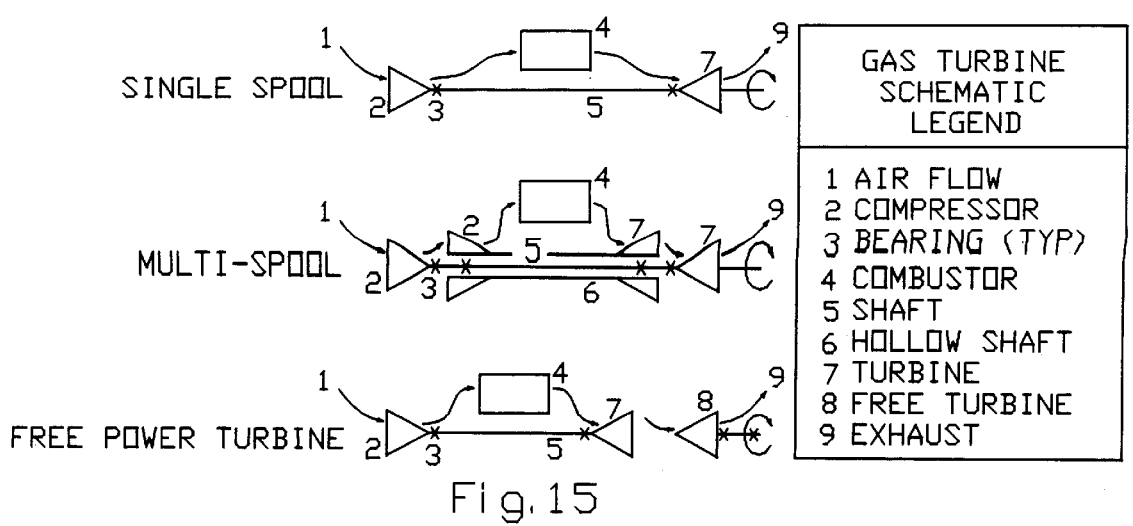
Fig. 15
| GAS TURBINE SCHEMATIC LEGEND |
|---|
| 1 AIR FLOW |
| 2 COMPRESSOR |
| 3 BEARING (TYP) |
| 4 COMBUSTOR |
| 5 SHAFT |
| 6 HOLLOW SHAFT |
| 7 TURBINE |
| 8 FREE TURBINE |
| 9 EXHAUST |

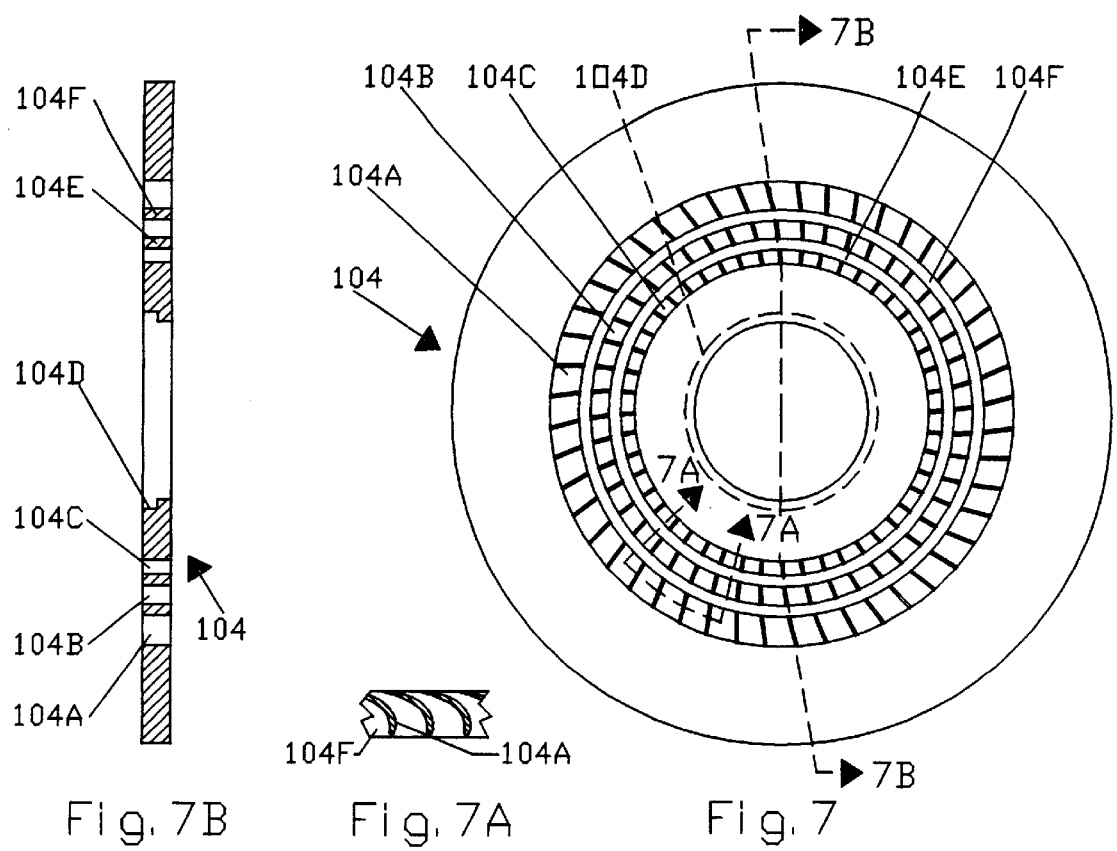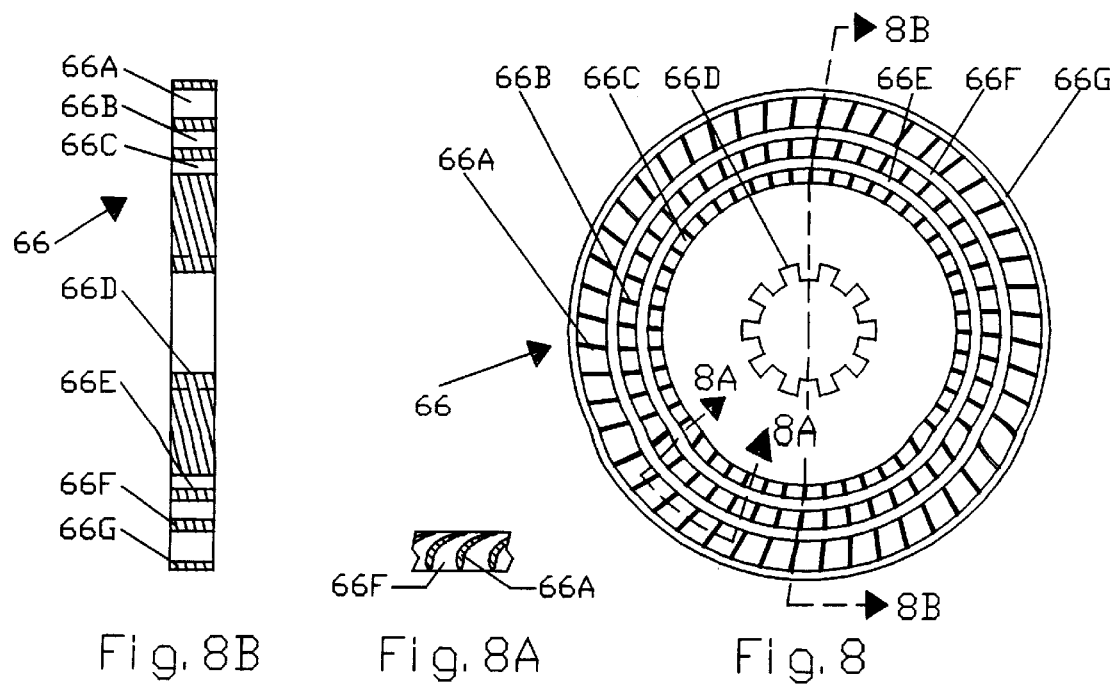

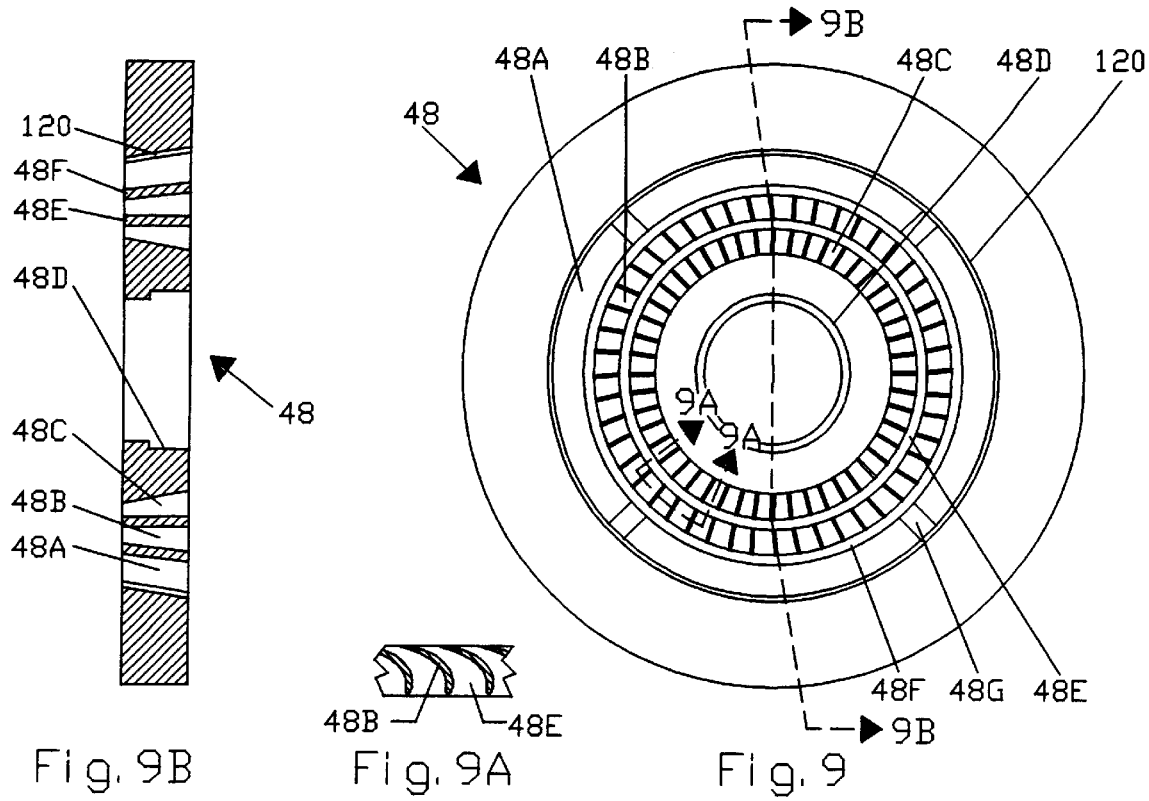
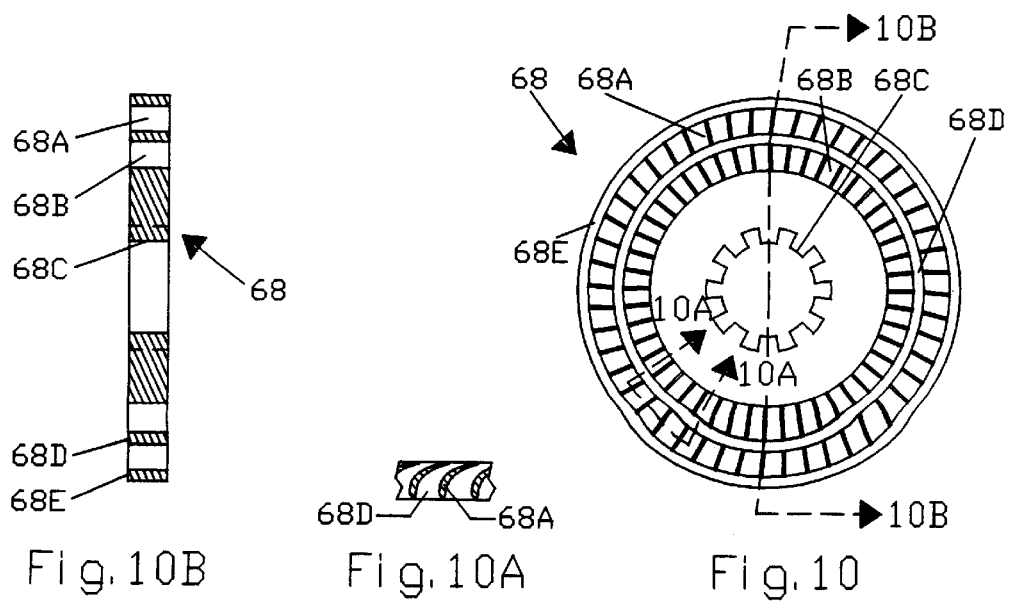

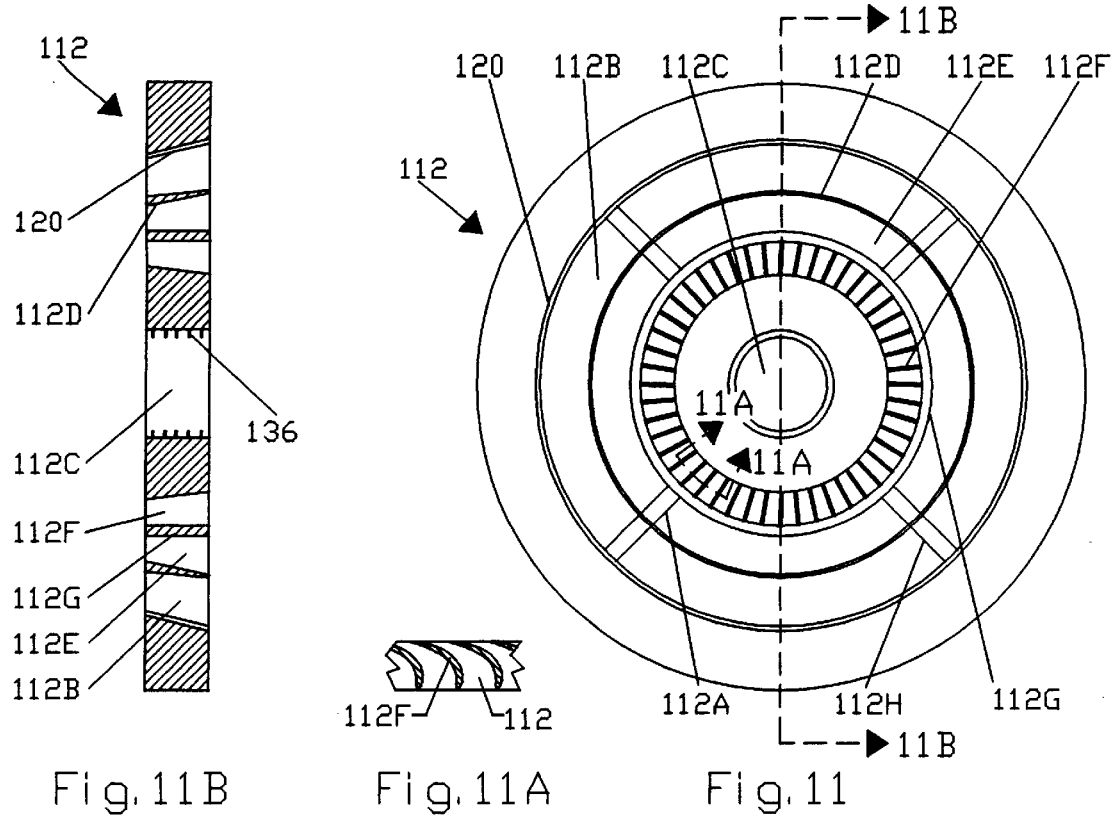
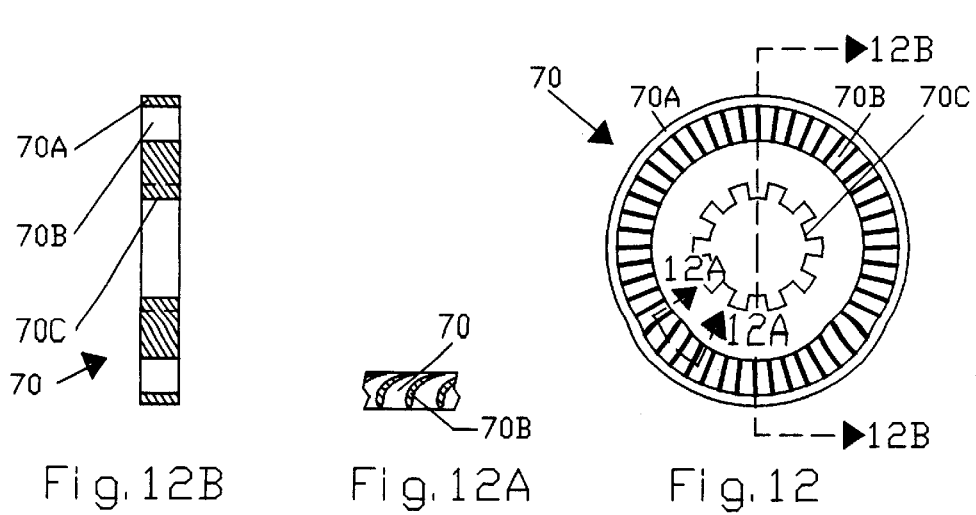
Fig. 11B  Fig. 11A  Fig. 11
Fig. 12B  Fig. 12A  Fig. 12

5,960,625

CONSTANT VOLUME COMBUSTION TURBINE WITH PLURALITY FLOW TURBINE WHEELS

CROSS-REFERENCES TO RELATED APPLICATIONS

Not Applicable.

STATEMENT REGARDING FEDERALLY SPONSORED RESEARCH OR DEVELOPMENT

The invention was not made under nor is there any relationship of the invention to federally sponsored research or development.

REFERENCE TO A "MICROFICHE APPENDIX"

Not Applicable.

BACKGROUND OF THE INVENTION

1. Field of the Invention

This invention relates to internal combustion engines and specifically to an improved gas turbine engine incorporating constant volume combustion for use in automotive and larger applications.

Gas turbine engines are used in many applications, but in the largest use of internal combustion engines—automobiles—they have not been commercially successful.

Presently, gas turbines use the excellent Brayton thermodynamic cycle (constant pressure combustion) and have performed well in large industrial and aircraft applications. However, there are limits to efficiency improvements and operation of this type of turbine which have prevented its use in some applications.

Another type of gas turbine incorporates a "constant volume combustion" cycle. The higher temperatures and pressures obtained from a specific air-fuel ratio in constant volume combustion enables great potential performance. This cycle can result in fuel savings and lower emissions than that obtained in present gas turbines, if the ensuing energy is utilized effectively.

A number of gas turbine designs have been patented in the past which utilize constant volume combustion including those referenced herein. The problems preventing their general use include high cost, waste of available energy present in combustion gases, idle and part-load performance, low specific power, inefficient process flow, minimal process improvements and cumbersome mechanical components. One of the most important problems—waste of available energy—is described as follows.

In gas turbines, creating a high velocity is a necessary step in transforming available energy of combustion into work. Hot combustion gases are accelerated through nozzles or stators by imposing a pressure differential thereon. The resulting high velocity gas will then "spin" turbine wheels. Impulse blading, reaction blading, or unorthodox blading installed on the turbine wheels convert the high velocity gases' energy to rotational power. However if the pressure difference across the turbine nozzle is too great, gases leaving the nozzle will experience a wild and turbulent expansion with acquisition of little or no increase in velocity above that obtained by a lower pressure. (The maximum useful pressure ratio between the nozzle inlet and outlet is called the critical pressure ratio, and results in a gas velocity equal to the speed of sound. The critical pressure ratio for turbine combustion gases of interest is approximately 1/0.54=1.85/1, but will be referred to as approximately 2 to 1 for simplification in the following discussions.) A large part of the available energy is lost by wasting high pressures which cannot perform useful work if the turbine nozzle pressure differentials are too large. At the other extreme, if the upstream pressure is too low, the resulting low nozzle velocity will be ineffective in producing work.

2. Description of the Related Art

The above energy loss due to turbulence by having only one set of nozzles would occur in the constant volume combustion turbine described by U.S. Pat. No. 4,693,075 to Sabatiuk, Sep. 15, 1987 unless the combustion pressures were kept very low. Low gas pressures in turn would require large machines for the production of relatively small amounts of output power. (This is called low specific power). If it were possible to maintain a high, constant, upstream pressure, the number of turbine nozzle stages would be increased so as to divide the high pressure into efficient smaller pressure steps for each nozzle set. (Each pressure step being equal or somewhat less than the critical pressure ratio.) Automotive size and intermediate size turbines require high revolutions per minute (RPM) to generate power. No matter how many chambers are firing per revolution of U.S. Pat. No. 4,693,075 to Sabatiuk, Sep. 15, 1987 or what angular relationship is provided between combustor intake and discharge, there is generally insufficient time for the complete combustion cycle postulated during one revolution of the rotor. For example if it operates at 40,000 RPM, one revolution is equal to 0.0015 seconds.

U.S. Pat. No. 5,237,811 to Stockwell, Aug. 24, 1993 schedules the opening and closing of constant volume combustion chamber exhaust connections to take place twice during each revolution of turbine (44D). Time between combustor discharge openings is approximately 0.0008 seconds if this turbine were operated at a speed of 40,000 RPM. It is submitted that a complete cycle—intake, combustion and discharge—cannot be completed during one-half revolution of a high speed device such as this. Complete combustion is limited by the velocity of the flame propagation. The routing of changing gas pressures through a set of fixed vanes operating in the position of a gas nozzle in this machine results in continued off-design performance. Gas velocity vectors controlled by the nozzle pressure ratio must match the speed and shape of the turbine wheel blades for efficient performance.

U.S. Pat. No. 4,570,438 to Lorenz, Feb. 18, 1986 addresses the constant volume combustion nozzle pressure problem by installing several nozzles and turbine wheels in series. If pressures upstream of the nozzles were constant this would be an effective solution for obtaining efficient nozzle operation. However combustion chamber pressures will decay as gases flow to nozzles from any constant volume combustor, which prevents a single series of fixed nozzles (and turbine wheels) from providing an efficient available energy conversion. Various arrangements of nozzles and turbine wheels are shown in FIGS. 2 through 6A, but all arrangements provide for flow of gases in a series disposition. U.S. Pat. No. 4,570,438 to Lorenz, Feb. 18, 1986 also preheats the air prior to entering the combustor. In contrast to a constant pressure process, air preheating is detrimental in a constant volume combustion cycle. Preheating will reduce the air density, decreasing the mass of air charge, in turn lowering the volumetric efficiency and specific power. The use of turbine blading as an exhaust fan is inefficient as the concave blade is turned in the wrong direction.

U.S. Pat. No. 3,791,139 to Simons, Feb. 12, 1974 incorporates a rotating combustor wheel with elongated, slender, constant volume combustion chambers. The patent describes this engine as "designed primarily for a metallic dust and gel fuel". The elongated, cylindrically shaped combustor rotor has nozzles and turbine blades built into each end of the rotor which are intended to propel it and provide output power through a central shaft. The machine does not include air compression or a means of cylinder purging, and does not address losses due to the declining pressure of constant volume combustion.

Additional References Cited.

U.S. Pat. No. 2,937,498 to Schmidt, May 24, 1960 preferred embodiments are turbo-jet applications. Two sets of combustors with end controls rotating at main shaft speed and operating in series produce substantially constant volume combustion. Combustors discharge into two sets of tubes supplying two coaxial gas streams to a single turbine blade ring which cannot efficiently handle two gas streams widely varying in pressure or velocity. The cumbersome tubing physically limits the number of annular gas streams (two) with originating pressure values (two) produced by the combustors, said two pressure steps cannot fully expand a high combustion pressure in relatively small steps except in inefficient, oscillating, series flow streams.

U.S. Pat. No. 3,417,564 to Call, Dec. 24, 1968 preferred embodiments are turbo-jet applications. Long narrow combustors, amenable to small engine cross-sections for low external aerodynamic drag, are used. A very high aspect ratio combustor configuration does not promote complete, efficient, combustion. This turbine requires two compressors, depends on a separate air pressure source to scavenge exhaust gas from combustor, and requires a dedicated exhaust system that is separate from the gas flow to the turbine wheels. Complex inlet and exhaust manifolds connected to the combustors incorporate scavenging means. A single annular gas flow stream is supplied to the turbine wheels, negating the possibility to discharge multiple gas streams which can fully and effectively utilize the variable pressures produced by constant volume combustion.

U.S. Pat. No. 3,611,720 to Fehleu, Dec. 12, 1971 describes a gas turbine utilizing a split combustion chamber which is half rotating and half fixed, having jet nozzles built into the rotating half. All fixed nozzles are subjected to the variable pressures which produce changing velocities and off-design performance. One revolution of the high speed main shaft provides limited time for a complete combustion cycle. A single annular gas flow stream is supplied to the turbine wheels, negating the possibility to discharge multiple gas streams which can fully and effectively utilize the variable pressures produced by constant volume combustion.

U.S. Pat. No. 4,241,576 to Gertz, Dec. 30, 1980 describes a turbo-jet engine incorporating constant volume combustion between the blades of a centrifugal fan which then discharges to a single annulus supplying the turbine wheels, negating the possibility to discharge multiple gas streams which can fully and effectively utilize the variable pressures produced by constant volume combustion. Four combustion cycles per revolution of the high speed main shaft provides insufficient time for complete combustion.

U.S. Pat. No. 3,811,275 to Mastrobuono, May 21, 1974, describes a complex gas turbine device in which jet nozzles are built into a combustor rotating at main shaft speed and producing two cycles per revolution. The combustor jets contributing to engine output are subjected to declining chamber pressures, creating changing velocities and fluctuating impulses. Different embodiments incorporate tortuous gas flow routes through various mechanical devices.

U.S. Pat. No. 4,620,414 to Christ, Nov. 4, 1986 incorporates a low pressure air supply limiting the combustion discharge gas pressure regardless of combustion temperature influence. The combustor, which is built in two pieces, contributes to sealing problems and the relatively small combustion chambers foster low specific power output. A single annular gas flow stream is supplied to the turbine wheel, negating the possibility to discharge multiple gas streams which can fully and effectively utilize the variable pressures produced by constant volume combustion.

U.S. Pat. No. 736,715 to Gervais, Aug. 18, 1903 utilizes a non-rotating combustor, poppet valves and a reciprocating valve actuating mechanism, limiting engine speed and gas production, and producing low specific power. A single annular gas flow stream is supplied to the single turbine wheel, negating the possibility to discharge multiple gas streams which can fully and effectively utilize the variable pressures produced by constant volume combustion.

U.S. Pat. No. 1,113,611 to Scheuer, Sep. 7, 1961 embodies a gas turbine utilizing an axial flow air compressor and a combustor rotating at high shaft speed and producing two combustion cycles per revolution with insufficient time to optimally execute intake, ignition, and expansion. A single annular gas flow stream is supplied to the turbine wheels, negating the possibility to discharge multiple gas streams which can fully and effectively utilize the variable pressures produced by constant volume combustion.

Prior art constant volume combustion turbines generally fall into the following categories:

- relatively high combustor exhaust pressure diluting intake air and making intake difficult
- declining combustor pressures resulting in large energy losses in fixed turbine nozzles
- insufficient time for combustion due to high speed of combustion cycles
- preheating air to combustor lowering volumetric efficiency
- complicated or cumbersome hardware designs
- inefficient, unorthodox turbine blade designs
- a low rate of combustion gas production
- complicated air and gas flow routing
- special fuel requirements A major shortcoming of turbine prior art is in not addressing the declining pressures inherent to the discharge of a constant volume combustion chamber, resulting in wasted energy. The problem of declining gas pressure resulting in inefficient nozzle and turbine operation is not readily apparent and may have been overlooked in past designs. In other cases, this problem may have been recognized, but ignored due to lack of an available solution. Gas turbine efficiency, performance, and cost factors must be outstanding in order to justify the huge cost required for testing, and adding to tooling and production methods now in place.

BRIEF SUMMARY OF THE INVENTION

In accordance with the present invention a constant volume combustion plurality flow gas turbine comprising prior art components in addition to rotating combustor and unique members for control of air and combustion gas flows, furnishing a plurality of separated, high frequency, co-annular gas streams through nozzles and turbine wheels having concentric turbine blade rings and incorporating integrated, predetermined, pressure differentials, fully utilizing the variable pressures associated with constant volume combustion and providing a machine efficient in utilization of energy available from fuel supplied.

The object of designing (and producing) a "constant volume combustion plurality flow turbine" (CVCPFT) is to provide a more energy efficient internal combustion engine and environmental friendly replacement for the aging reciprocating automotive engine (and other applications). It will provide improvements over gas turbine prior art, at a reasonable cost, in a manner providing reliability, with features attractive to consumers, industry and regulatory agencies. The CVCPFT accomplishes this without the regenerator or heat recovery device which is generally required with a Brayton type turbine, greatly reducing costs. The theoretical advantage of constant volume combustion over constant pressure combustion is discussed many places, and is evidenced by the many patents proposing its use.

Energy in the declining discharge pressure of a constant volume combustion chamber is effectively converted to rotational power in my turbine. Other advantages of the CVCPFT include quasi-continuous flow of combustion gas through the unit, adequate provision for a fresh air supply to the combustor, and adequate time for achieving complete fuel combustion.

The CVCPFT accommodates contemporary ranges of gas turbine design temperatures and pressures in an efficient manner. It can be furnished with optional features that are used on present turbines. The CVCPFT incorporates existing technology and prior art axial flow turbine blade airfoils, centrifugal compressors, fuel and ignition systems, bearings, lubrication and cooling systems, gears, materials, exhaust systems, sound suppression systems, other basic components and support systems. Smooth air and gas flow passages designed into the unit provides minimum flow pressure losses. Component and nozzle sizing maintain flow rates and pressure balances for efficient operation.

The CVCPFT eliminates or greatly reduces certain disadvantages of prior art by utilizing relatively simple but highly effective stationary and rotating members. Combustion chamber gases are discharged in predetermined steps of pressure ranges, allowing turbine wheel nozzles to operate at efficient pressure ratios. Turbine wheels receive correct velocities and can operate at high overall cycle pressures, providing high specific power.

Efficiency and fuel economy of the CVCPFT is theoretically approximately 1½ to 2 times greater than a comparable piston engine. Efficiency and fuel economy of the CVCPFT can be greater than a comparable Brayton cycle turbine when neither are equipped with heat recovery systems. In comparable applications where both turbine types have heat recovery equipment for compound or dual cycles, the CVCPFT is theoretically more efficient with best fuel economy. Further objects and advantages of my invention will become apparent from a consideration of the drawings and ensuing description.

BRIEF DESCRIPTION OF THE SEVERAL VIEWS OF THE DRAWINGS

Reference is made to the drawings forming a part hereof and in which:

FIG. 9 is a side view of a second gas nozzle plate.

FIG. 9A is a partial cross-sectional view taken along the line 9A—9A in FIG. 9.

FIG. 9B is a cross-sectional view taken along the line 9B—9B in FIG. 9.

FIG. 10 is a side view of a second turbine wheel.

FIG. 10A is a partial cross-sectional view taken along the line 10A—10A in FIG. 10.

FIG. 10B is a cross-sectional view taken along the line 10B—10B in FIG. 10.

Figure 1:
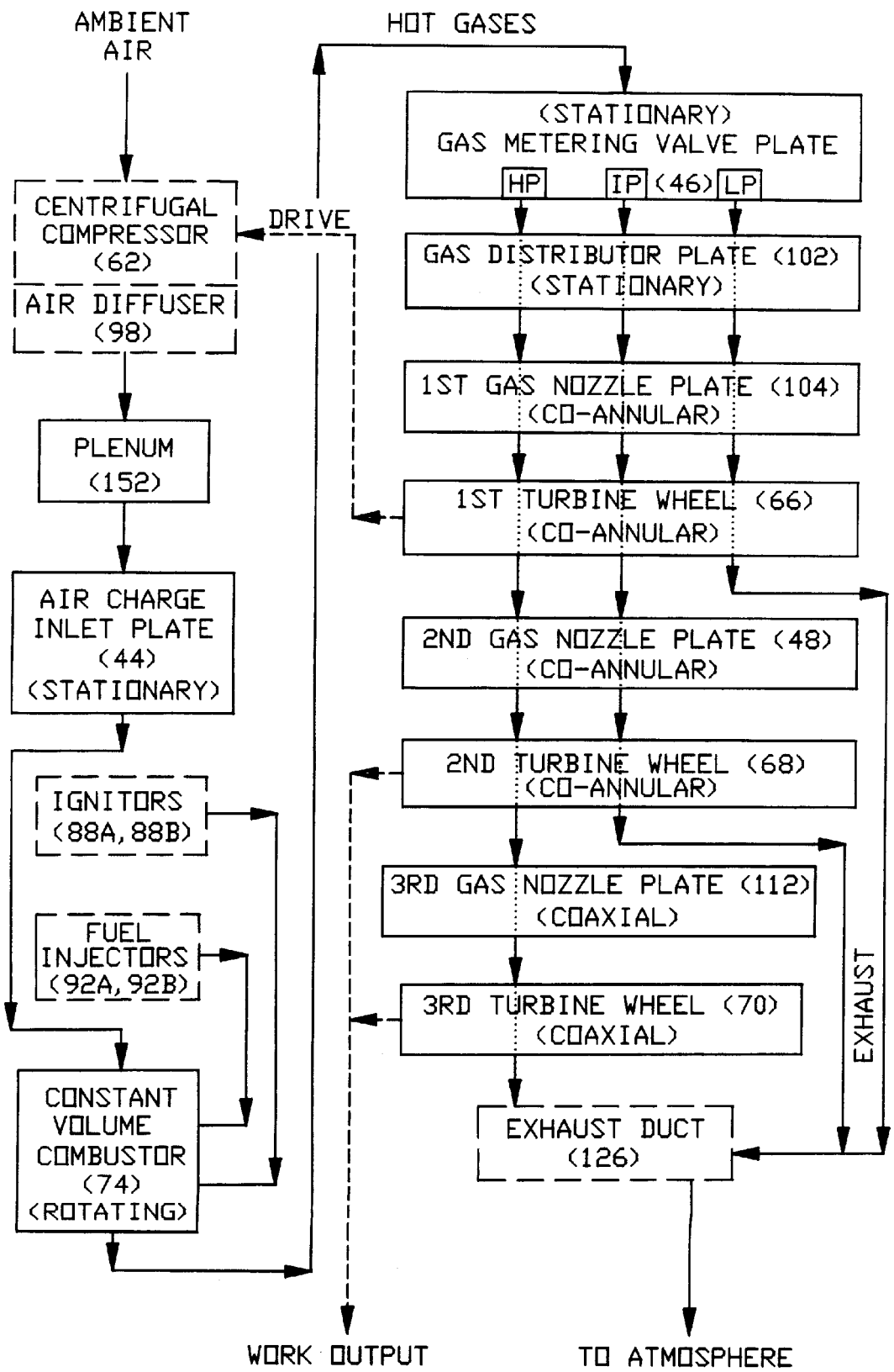
FIG. 1 is a process flow diagram of the basic CVCPFT cycle.

Note: A glossary is provided on page 20.

REFERENCE NUMERALS IN DRAWINGS
(BASIC CYCLE)

| | | |
|---|---|---|
| 20-20H housing | 74-74U constant volume combustor | 114 3rd insulator plate |
| 22 bellmouth | | 116-116F exhaust gas guide |
| 24 main shaft | 76 worm gear | |
| 26 output shaft | 78 worm gear | |
| 28 bearing | 80 worm gear | 118 exhaust torus |
| 30 bearing | 82A helical gear | 120 liner |
| 32 bearing | 82B helical gear | 122 cartridge insulator |
| 34 bearing | 84 gear shaft | |

-continued

| | | |
|---|---|---|
| 36 combustor shaft | 86 gear shaft | 124 flange |
| 38 bearing | 88A ignitor | 126 exhaust duct |
| 40 bearing | 88B ignitor | 128A labyrinth seal |
| 42 spider plate | 90A ignitor wire | 128B labyrinth seal |
| 44-44G air charge combustor inlet plate | 90B ignitor wire | 130A labyrinth seal |
| | 92A fuel injector | 130B labyrinth seal |
| 46-46I gas metering valve plate | 92B fuel injector | 132A labyrinth seal |
| | 94 insulator block | 132B labyrinth seal |
| 48-48G 2nd gas nozzle plate | 96A tube | 134 labyrinth seal |
| | 96B tube | 136 labyrinth seal |
| 50A cartridge | 98 air diffuser | 138 labyrinth seal |
| 50B cartridge flange | 100 air flow cylinder | 140 labyrinth seal |
| 52 bearing | 102-102H gas distributor plate | 142 labyrinth seal |
| 54 bearing | | 144 nut |
| 56 bearing | 104-104F 1st gas nozzle plate | 146 nut |
| 58 bearing | | 148 washer |
| 60 auxiliaries drive spider | 106 1st insulator plate | 150 washer |
| | 108 insulation | 152 plenum |
| 62 centrifugal compressor | 110 2nd insulator plate | 154 spider bracket |
| | 112-112H 3rd gas nozzle plate | 156 bearing housing |
| 64 worm gear drive | | |
| 66-66G 1st turbine wheel | | |
| 68-68E 2nd turbine wheel | | |
| 70-70C 3rd turbine wheel | | |
| 72 output drive spider | | |

Figure 14:
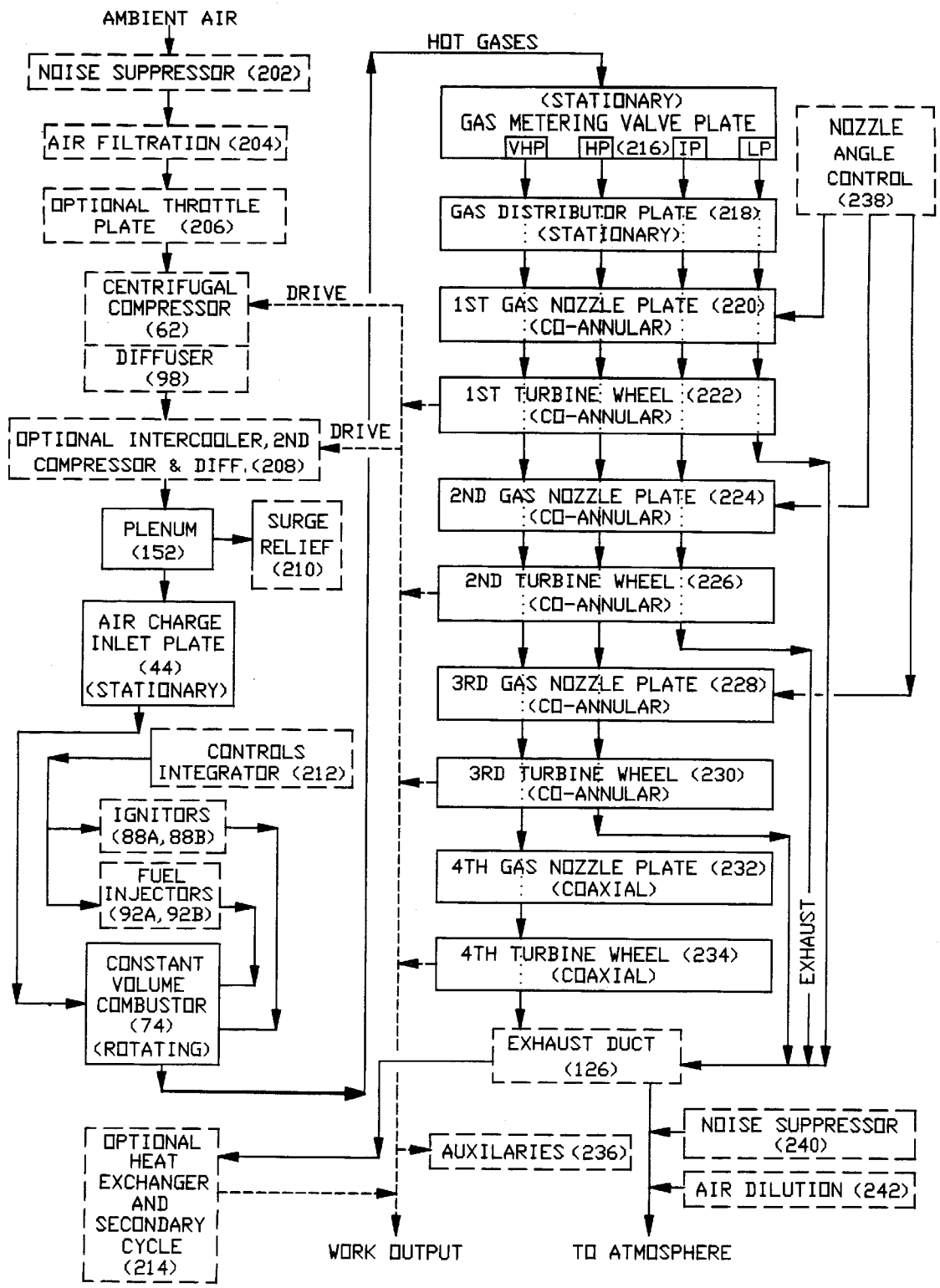
FIG. 14 is a process flow diagram illustrating modifications which can be incorporated.
Figure 1:
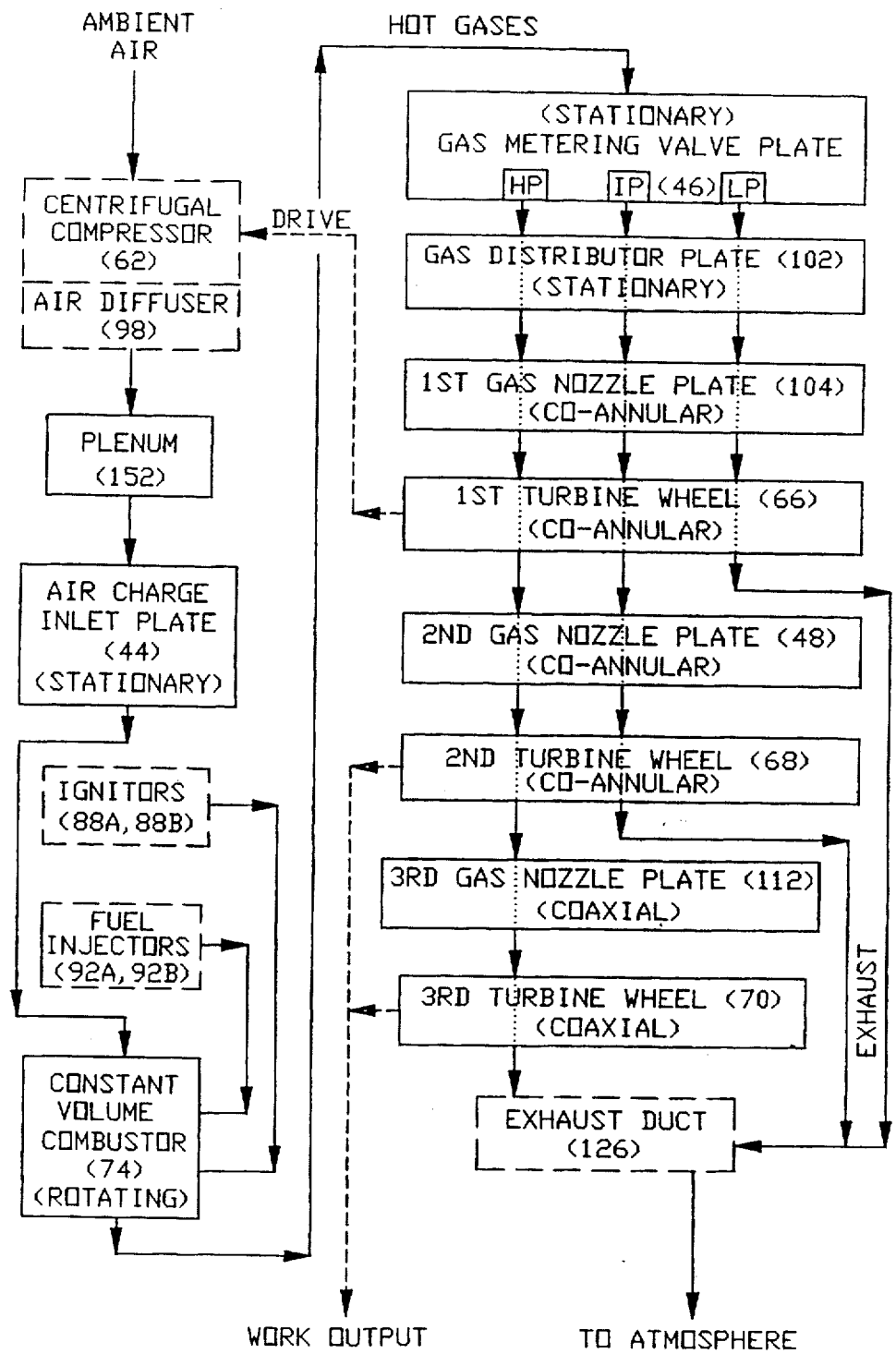

(Reference numerals for equipment other than basic cycle are 200 series items shown in FIG. 14)

DETAILED DESCRIPTION OF THE INVENTION

Figure 2:
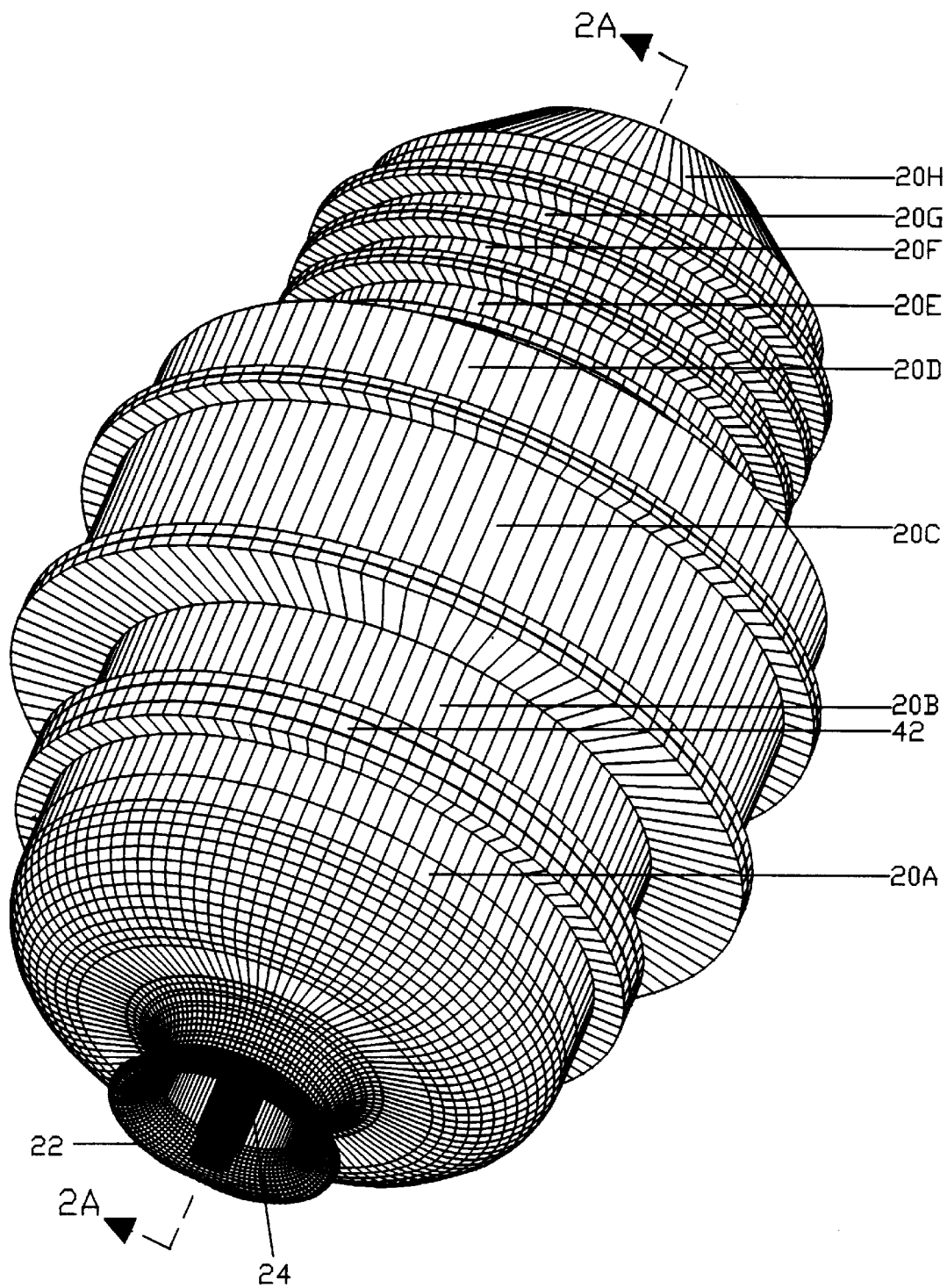
FIG. 2 is an isometric view of the gas turbine.

FIG. 2 exterior view includes gas turbine housing 20A through 20H components, an ambient air inlet bellmouth 22, part of a main shaft 24 and the outer surface of a spider plate 42. Penetrations and attaching parts are not shown in FIG. 2. Only the basic shape of the CVCPFT housing assembly is shown.

Figure 2B:
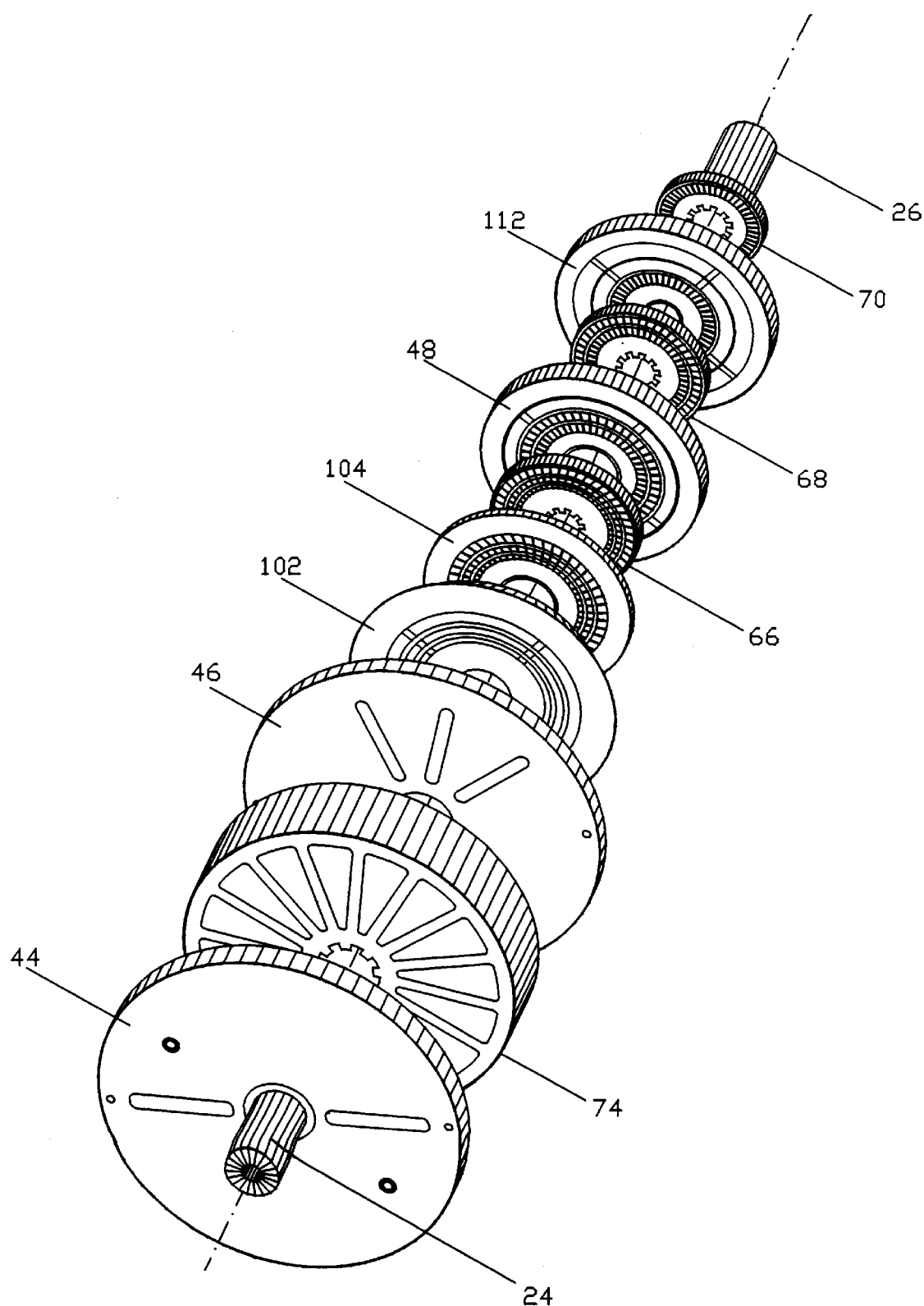
FIG. 2B is an isometric projection of major unique internal components.
Figure 2:
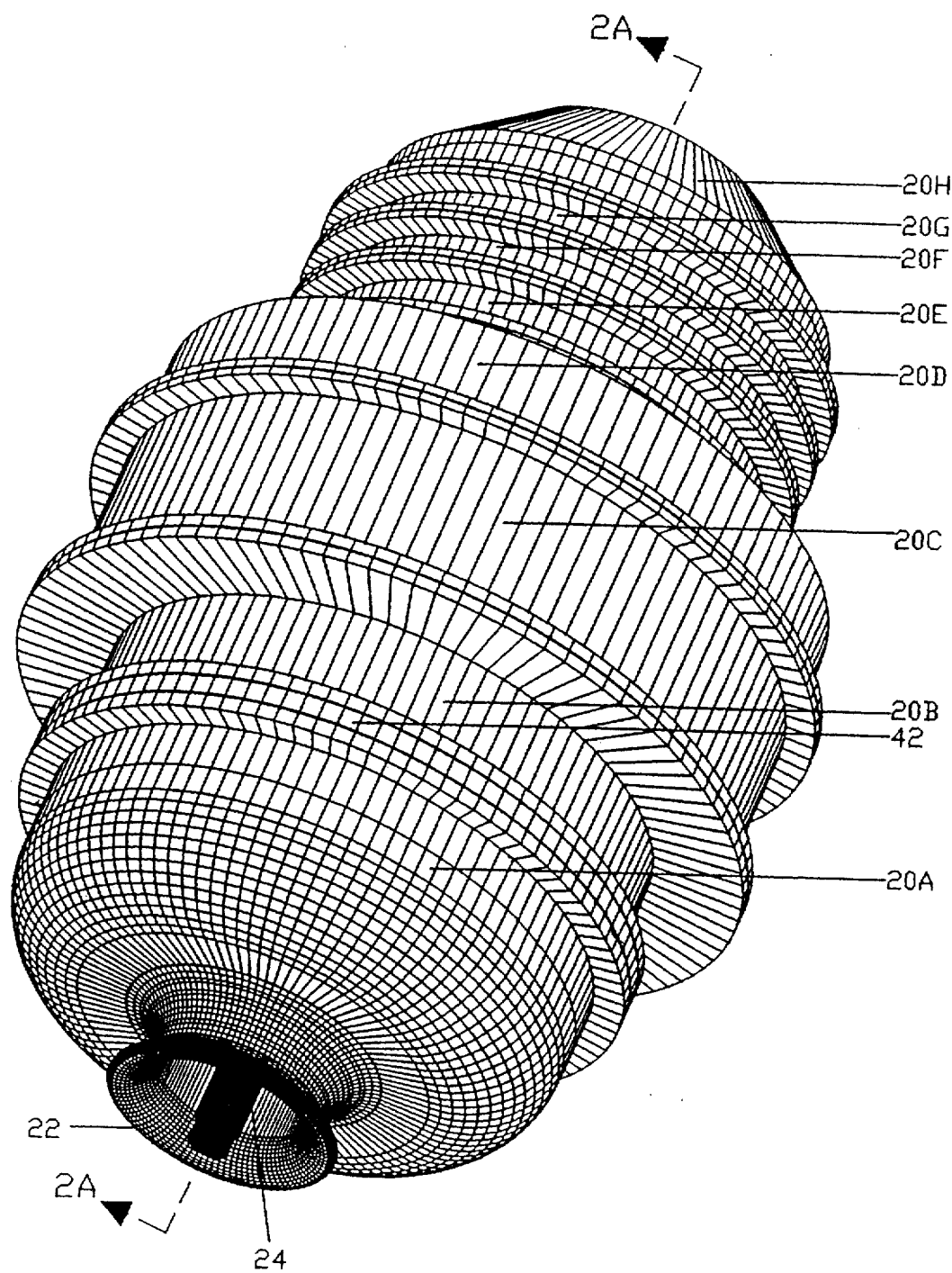
Figure 2A:
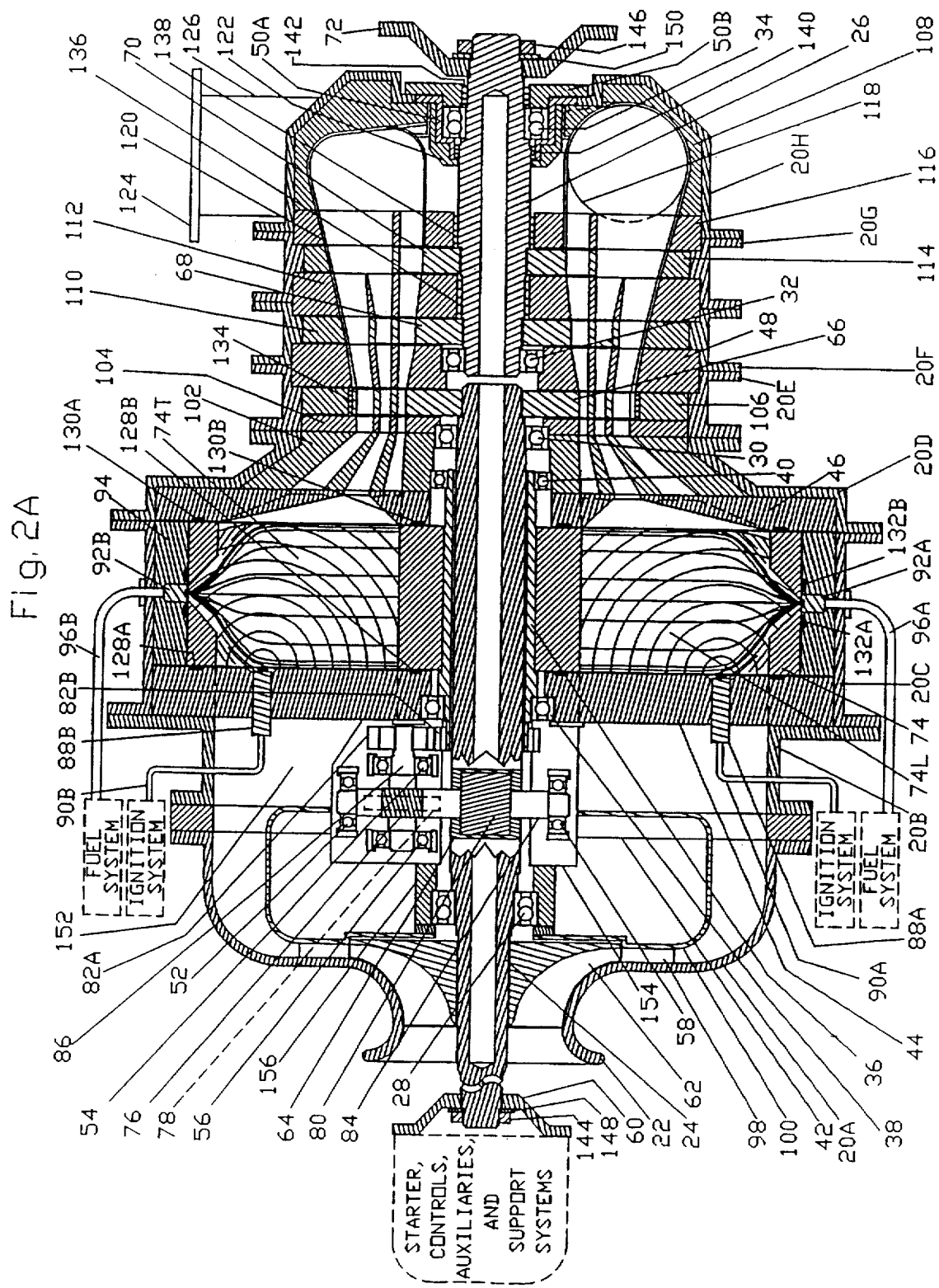
FIG. 2A is a longitudinal cross-sectional view taken along the line 2A—2A of FIG. 2.
Figure 2B:
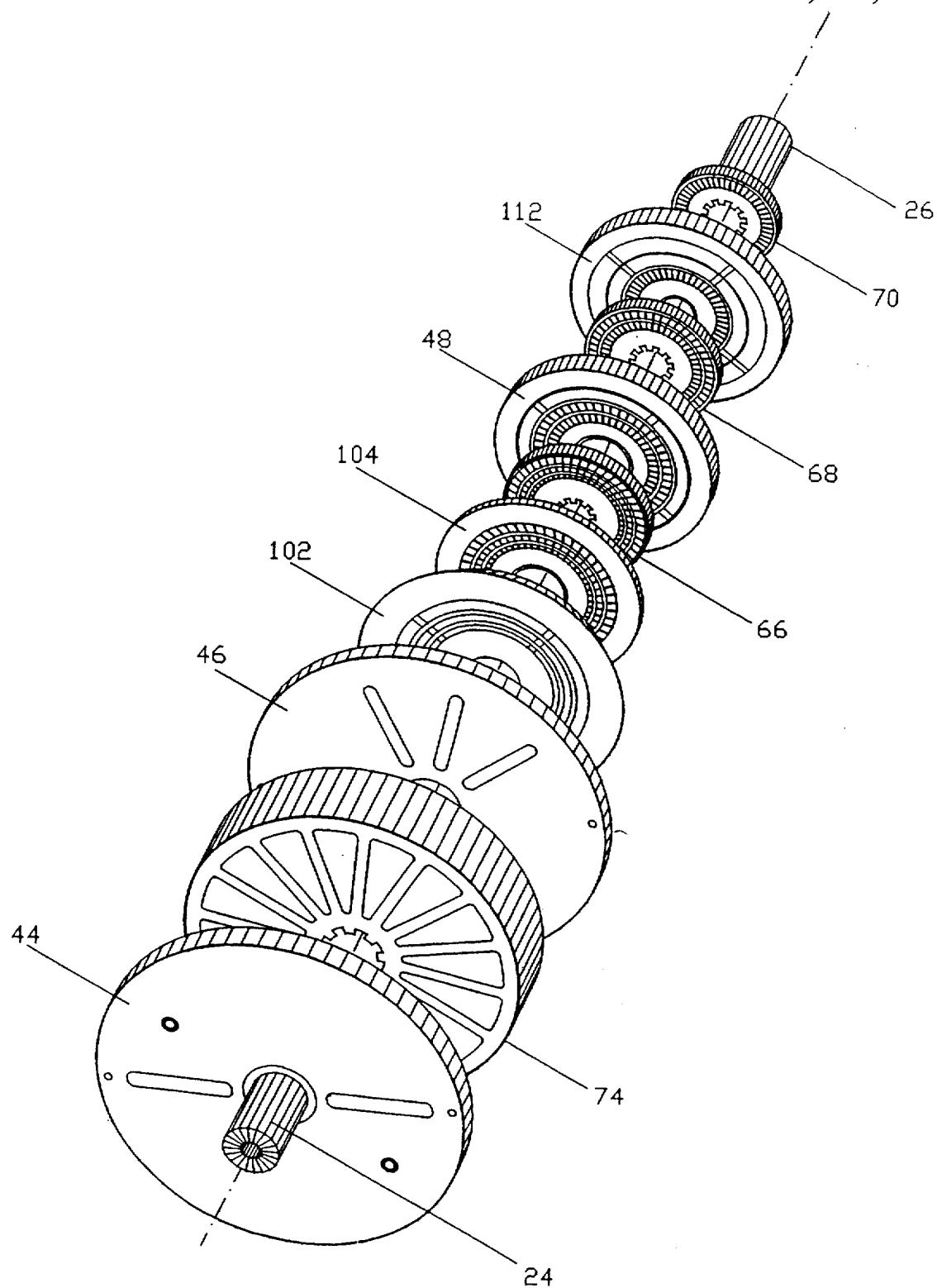
Figure 3A:
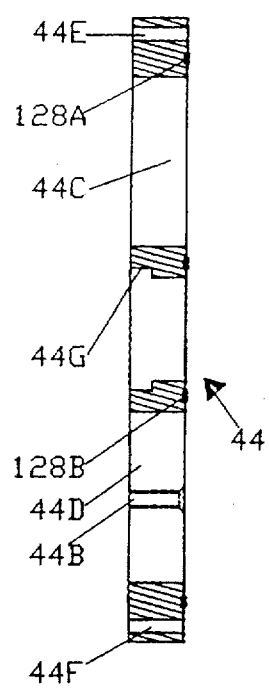
Figure 3:
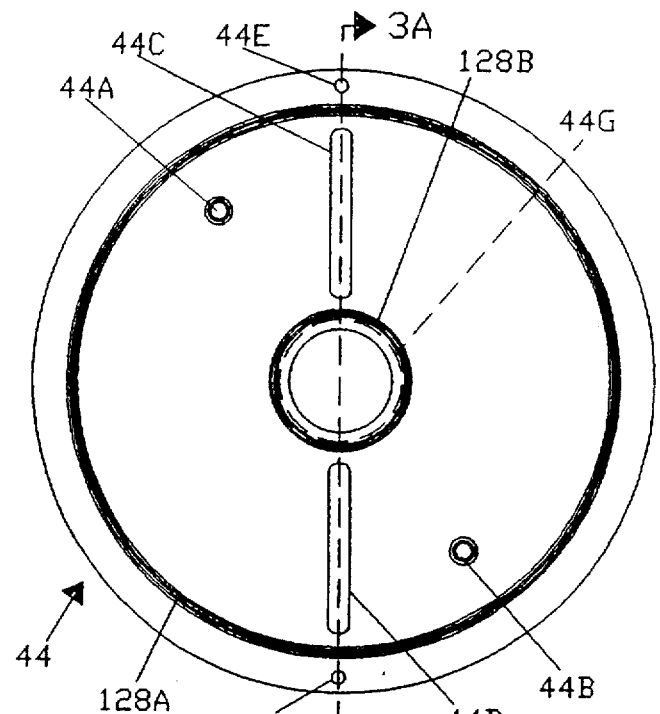
Figure 4A:
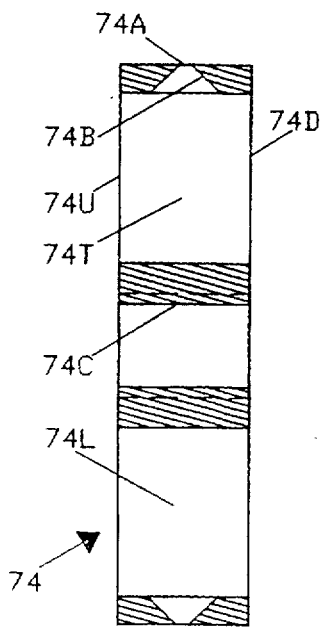
Figure 4:
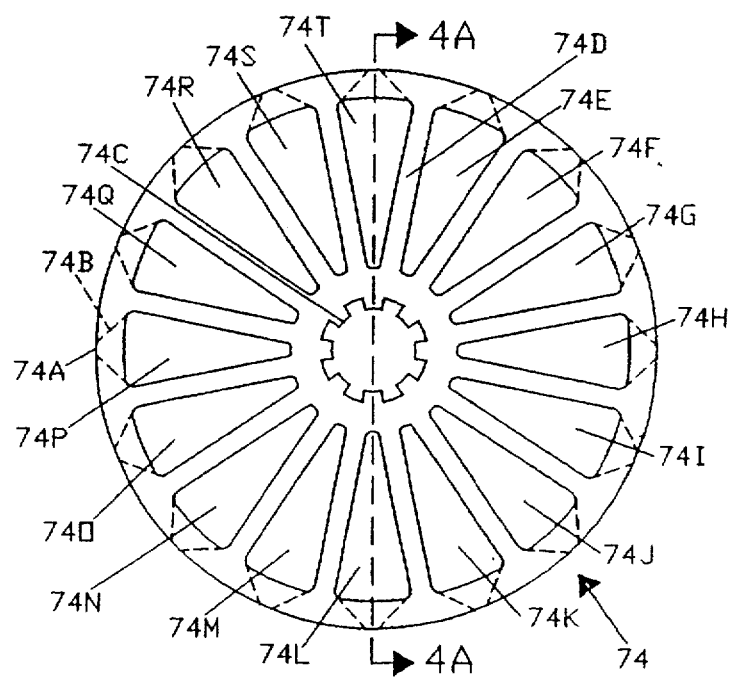

FIG. 2A shows an assembly of major components in longitudinal section and includes a side view of internal gearing. Housing 20A through 20H is assembled using bolts (not shown) through indicated flanges with internal parts and housing parts assembled sequentially. Bellmouth 22 is part of housing 20A. Main shaft 24 and an output shaft 26 are located on centerline of housing 20A–20H by bearings 28, 30, 32 and 34. A hollow combustor shaft 36 is located on the same centerline by bearings 38 and 40. Spider plate 42 connected to housings 20A and 20B supports bearing 28. A fixed air charge combustor inlet plate 44, positioned by housing 20B and an insulator block 94, supports bearing 38. Bearings 30 and 40 are supported by a gas distributor plate 102 which is positioned by housing 20D. A second gas nozzle plate 48 is positioned by housings 20E and 20F and supports bearing 32. Bearing 34 is supported by a bearing cartridge 50A which is held by a flange 50B bolted to housing 20H. Worm drive bearings 52, 54, 56 and 58 are supported by spider plate 42.

Continuing in FIG. 2A, an auxiliaries drive spider 60 (also used in starting the turbine), a centrifugal compressor 62, a worm gear drive 64, and a first turbine wheel 66 are attached to main shaft 24. A second turbine wheel 68, a third turbine wheel 70, and an output drive spider 72 are attached to output shaft 26. A constant volume combustor 74 attached to combustor shaft 36 rotates at low speeds driven by a series of worm gears 64, 76, 78 and 80, and helical gears 82A and 82B. Gear shafts 84 and 86 support the gears and in turn are supported by the bearings described above. Combustion chambers 74E through 74T, FIG. 4, in combustor 74 are juxtaposed between inlet plate 44 and a fixed gas metering valve plate 46. Only chambers 74L and 74T appear in FIG. 2A. Ignitors 88A and 88B penetrate inlet plate 44 and are connected to a prior art ignition system by ignitor wires 90A and 90B. Fuel injectors 92A and 92B extend through insulator block 94 and are connected to a prior art fuel system by tubes 96A and 96B. Prior art controls and other prior art turbine support systems are connected to auxiliaries drive spider 60. An air diffuser 98 is connected to and positioned between housing 20A and a flow cylinder 100, which is supported by spider plate 42. Valve plate 46 is connected to and positioned by insulator block 94, housing 20D and gas distributor plate 102. (Where the need is indicated, the words "attached to", "connected to", and "supported by" include the use of screws or other conventional fastening method, although the method is not detailed on the drawing.) A first gas nozzle plate 104 is connected to distributor plate 102, housing 20E and a first insulator plate 106. Second gas nozzle plate 48 is connected to first insulator plate 106 and a second insulator plate 110, and is supported by housing 20E and 20F. In a similar manner, second insulator plate 110, a third gas nozzle plate 112, a third insulator plate 114, and an exhaust gas guide 116 are connected and supported by the housing and adjacent stationary members. An exhaust torus 118 and a liner 120 are connected to and supported by the insulator plates, insulation 108, nozzle plates and a cartridge insulator 122.

FIG. 2A also shows a flange 124 connected to an exhaust duct 126 which is connected to housing 20H and exhaust torus 118. Labyrinth seals 128A and 128B are connected to and supported by inlet plate 44, contacting the inlet side of combustor 74. Labyrinth seals 130A and 130B are connected to and supported by valve plate 46, and contact the discharge side of combustor 74. Labyrinth seals 132A and I 32B are connected to and supported by insulator block 94, contacting periphery of combustor 74. A labyrinth seal 134 is connected to and supported by first insulator plate 106, contacting first turbine wheel 66. A labyrinth seal 136 is connected to and supported by nozzle plate 112, contacting output shaft 26. A labyrinth seal 138 is connected to guide 116, also contacting output shaft 26. A labyrinth seal 140 is connected to and supported by cartridge 50A, also contacting output shaft 26. A labyrinth seal 142 is connected to and supported by flange 50B, also contacting output shaft 26. In a similar manner, miscellaneous prior art seals can be installed throughout the assembly to contain air, gases and lubricants in their respective flow paths but are not shown. Nuts 144 and 146, and washers 148 and 150 are installed on ends of main shaft 24 and output shaft 26 to retain drive spider 60 and drive spider 72. A plenum 152, formed by the cavity created between the housing and inlet plate 44, contains pressurized air. Spider plate 42 supports a spider bracket 154, which in turn supports the worm drive bearings, gears and shafts, and a bearing housing 156.

FIG. 2B shows major unique components, but with adjacent parts separated more than shown in FIG. 2A, to enable viewing in isometric projection. Inlet plate 44, valve plate 46, distributor plate 102, nozzle plates 48, 104, and 112 are all stationary; and have part numbers placed on the left side of FIG. 2B. Shafts 24 and 26, combustor 74, and turbine wheels 66, 68, and 70 are all rotating components; and have their part numbers placed on the right side. Rotating and stationary parts shown are coaxial. Rotation in either direction can be incorporated in the design. (Only segments of shafts 24 and 26 are shown, and fuel injection openings in combustor 74 are not shown.)

Figure 3A:
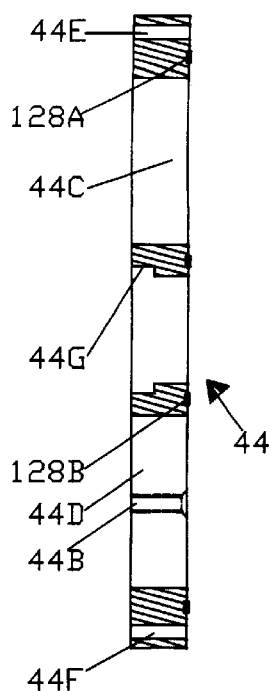
FIG. 3A is a cross-sectional view taken along the line 3A—3A in FIG. 3.
Figure 3:
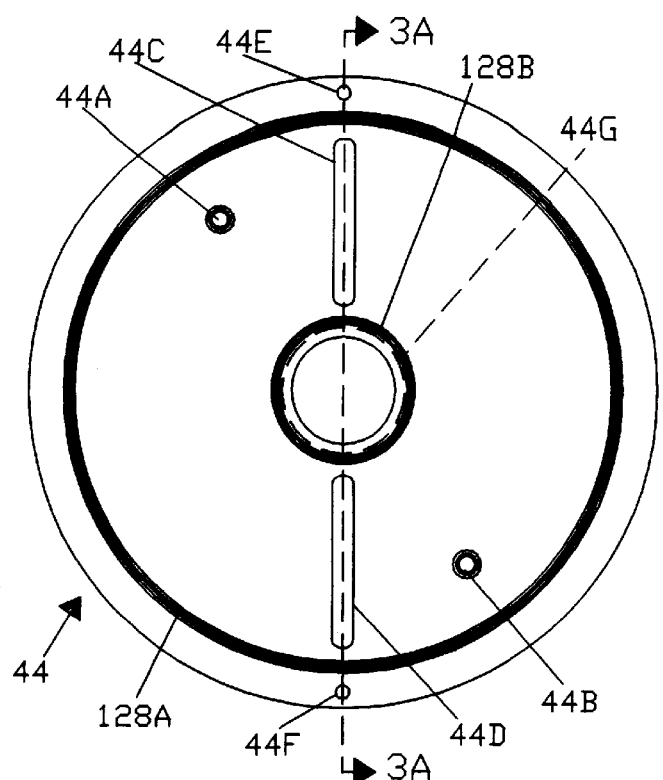
FIG. 3 is the side view of an air charge combustor inlet plate.

FIGS. 3 and 3A show details of inlet plate 44. Threaded ignitor holes 44A and 44B are positioned to provide ignitor operation at the required cycle time. Air inlet openings 44C and 44D are sized to rapidly fill the combustor with minimum pressure loss from the high pressure air plenum. Holes 44E and 44F are for dowel pin alignment. A counterbore 44G accommodates the combustor shaft bearing. Attached labyrinth seals 128A and 128B seal against the rotating combustor. Typical inlet plate construction material is high temperature alloy or ceramic of prior art.

Figure 4A:
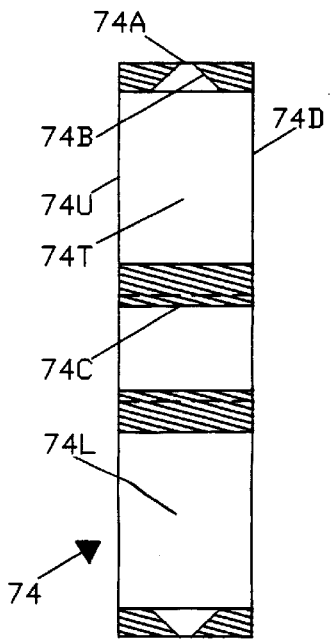
FIG. 4A is a cross-sectional view taken along the line 4A—4A in FIG. 4.
Figure 4:
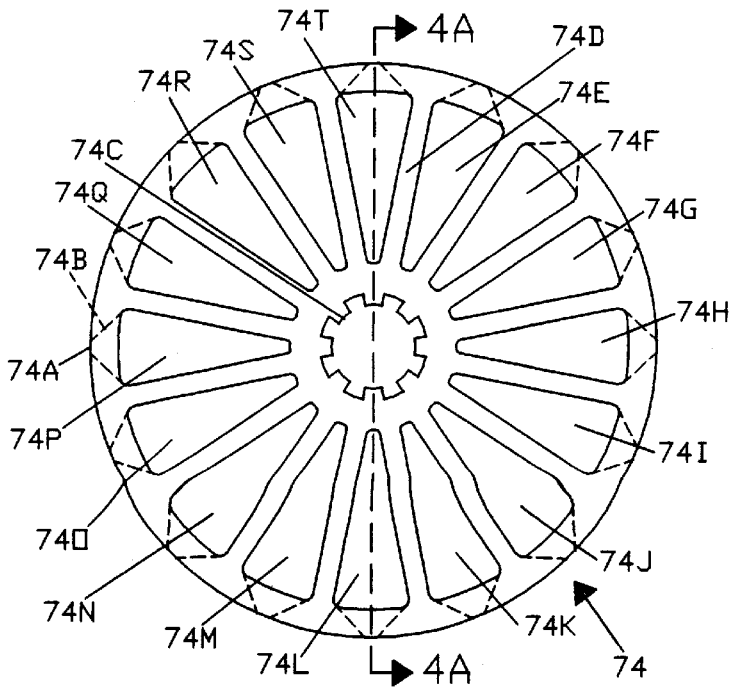
FIG. 4 is the side view of a constant volume combustor.

FIGS. 4 and 4A show details of rotating constant volume combustor 74. The combustor is cylindrically shaped having flat, parallel ends, and triangular shaped combustion chambers, 74E through 74T, equidistant from the center. The sixteen individual chambers extend the entire width of the combustor. A truncated cone-shaped opening 74A with sloping sides 74B in each of the chambers accommodates fuel injection as the combustor rotates past the point of injection. A splined bore 74C provides attachment to the combustor shaft. Flat surfaces 74D and 74U provide sealing surfaces against the inlet plate seals on one side, and the valve plate seals on the other side. Coplanar lands of the flat surfaces between the chambers are of sufficient width to prevent gas flow from one chamber to another. Typical construction material is an existing high temperature alloy or ceramic with surfaces smooth and polished.

Figures 5, 5A:
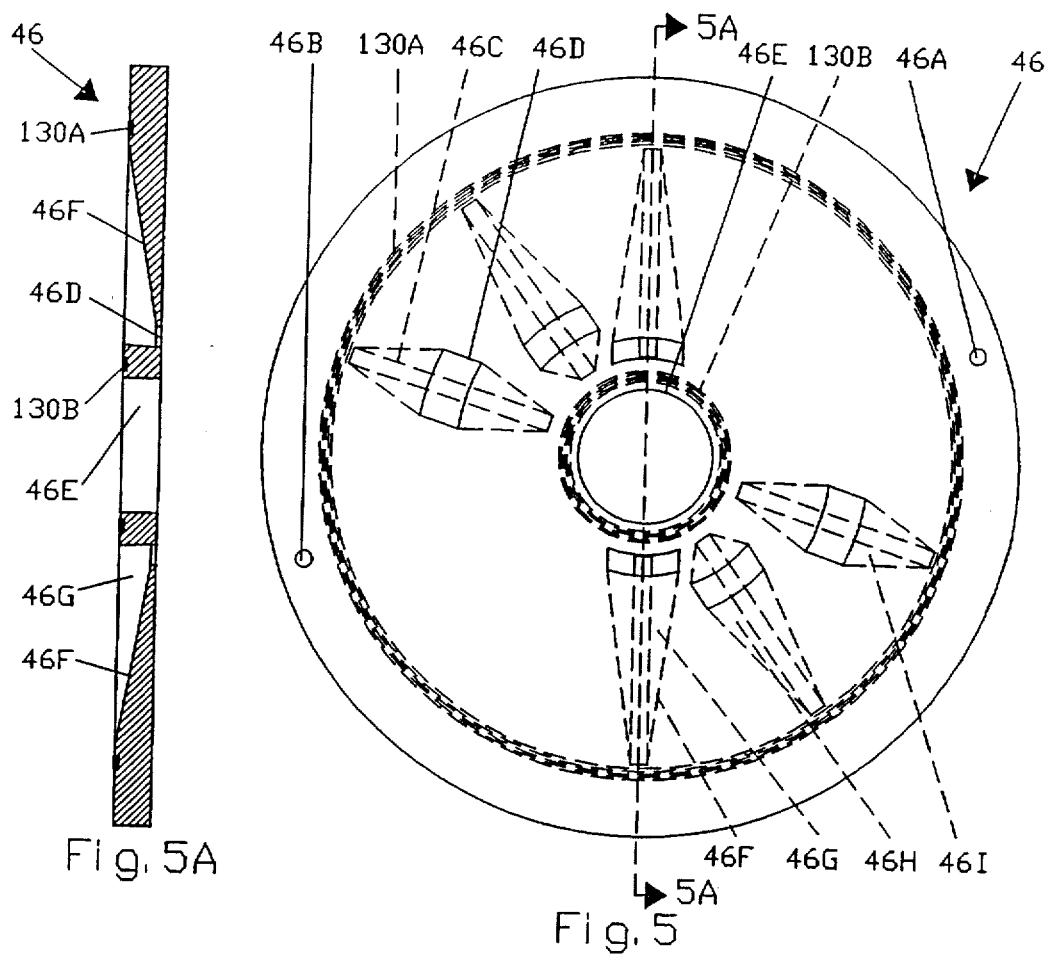
FIG. 5 is the side view of a gas metering valve plate.
FIG. 5A is a cross-sectional view taken along the line 5A—5A in FIG. 5.

FIGS. 5 and 5A show details of stationary gas metering valve plate 46. Holes 46A and 46B receive dowel pins providing angle indexing of the valve plate. Elongated inlet ports 46C are sized for minimum pressure loss of gas flowing from the combustor, and are shaped to accommodate sealing by the lands on the combustor side. Generally rectangular and arcuate shaped outlet areas 46D on the opposite surface of the valve plate are shaped to provide maximum flow cross-sectional area, and are in continuous contact with the adjacent distributor plate co-annular openings. A sidewall 46F forms a high pressure gas passage 46G between the inlet and outlet. The specially shaped passages convert the radial orientated inlet ports 46C to circular-compatible outlet areas 46D with minimum pressure loss. This gradual 90 degree rotation of flow aspect ratio orientation is necessary for smooth gas flow. Passages 46H and 46I communicate between the combustor and the distributor in like manner, and are positioned to transmit the intermediate and low pressure gases respectively. Three pressure steps of two simultaneous combustion cycles are provided by the six passages. Labyrinth seals 130A and 130B are fixed in the side of valve plate 46, contacting the moving face of the combustor, sealing combustion gases. A central hole 46E provides clearance around the combustor shaft. Construction material is alloy or ceramic and surfaces are smooth and polished.

Figure 6A:
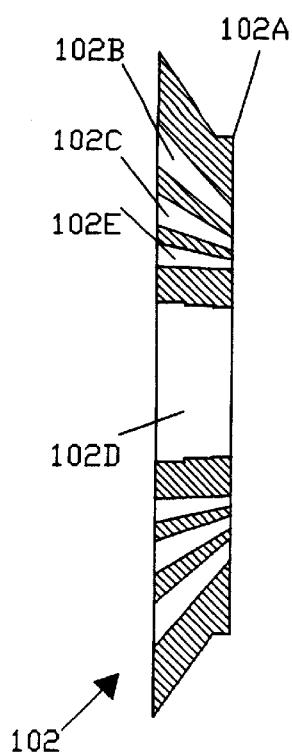
FIG. 6A is a cross-sectional view taken along the line 6A—6A in FIG. 6.
Figure 6:
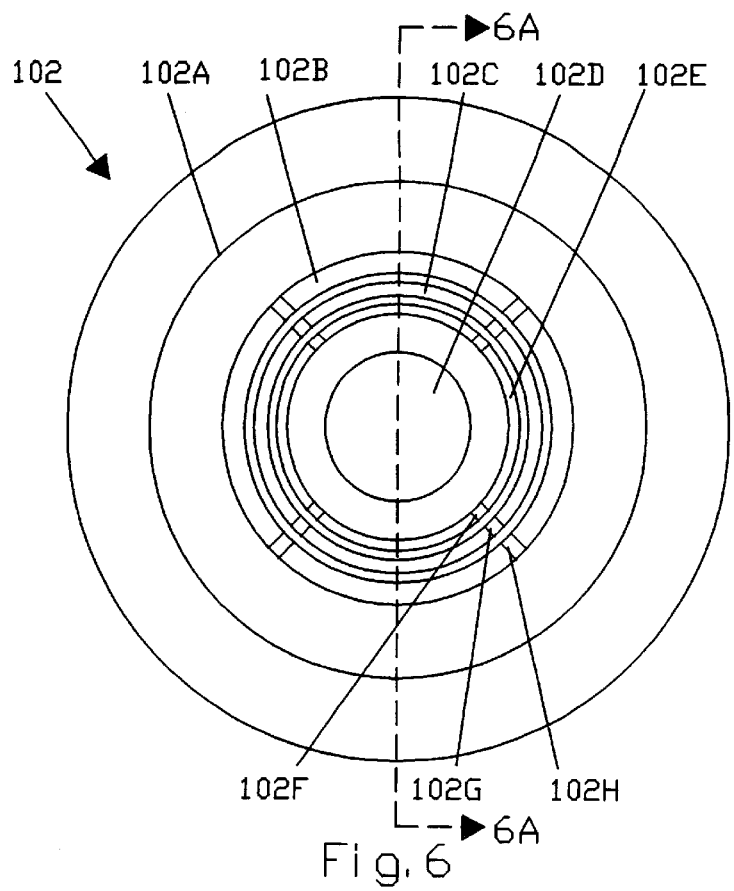
FIG. 6 is the side view of a gas distributor plate.

FIGS. 6 and 6A show details of stationary gas distributor plate 102. A shoulder 102A positions the plate in the housing. Converging co-annular passages 102B, 102C and 102E route low pressure, medium pressure and high pressure gases, respectively, from the valve plate to the first nozzle plate. In addition, each of the passages distribute gas circumferentially to the nozzles. A bore 102D has three offsets which allow positioning of the main shaft bearing and the combustor shaft bearing. Radial struts 102F, 102G, and 102H provide physical continuity and are placed to minimize flow obstruction. Construction material is alloy or ceramic and flow passages are smooth and polished.

Figures 7, 7A, 7B:
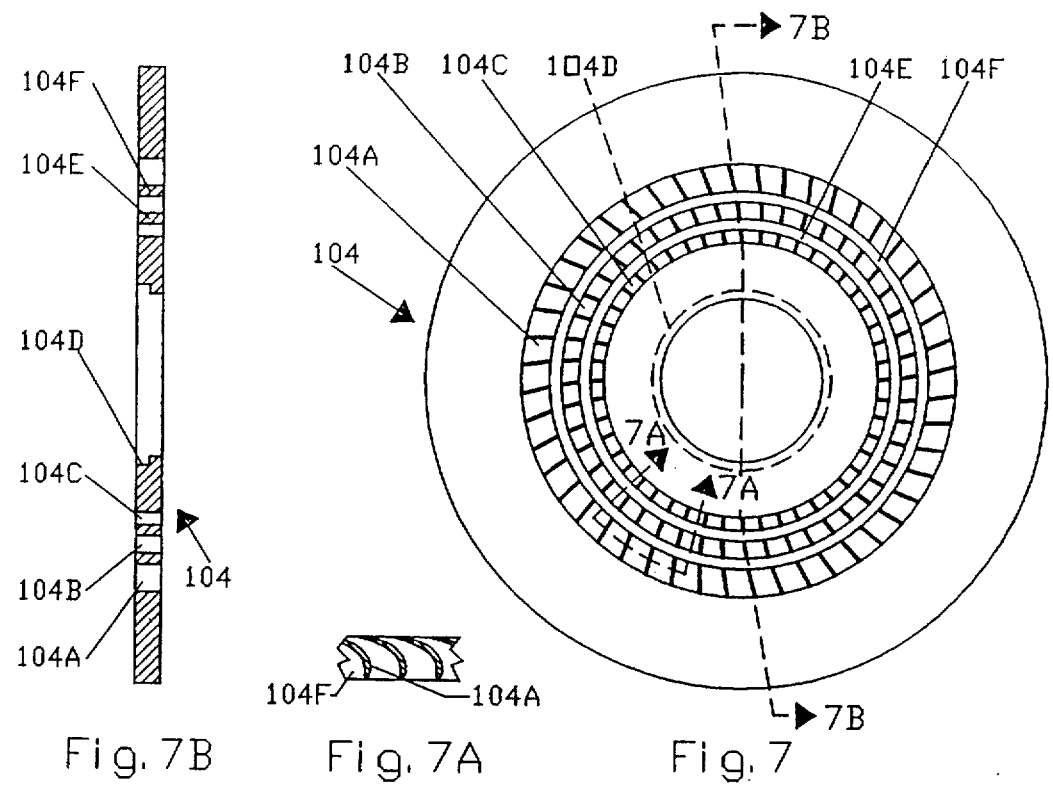
FIG. 7 is the side view of a first gas nozzle plate.
FIG. 7A is a partial cross-sectional view taken along the line 7A—7A in FIG. 7.
FIG. 7B is a cross-sectional view taken along the line 7B—7B in FIG. 7.

FIGS. 7, 7A and 7B show details of stationary first gas nozzle plate 104. Co-annular nozzle vane rings 104A, 104B and 104C are sized to accelerate the co-annular gas streams of the low pressure, medium pressure and high pressure stages respectively. Individual nozzle vane airfoils are designed and manufactured in the manner of axial flow prior art. A counterbore 104D positions the coaxial main shaft bearing. Solid rings 104E and 104F separate high, medium and low pressure flow areas. Construction material is alloy or ceramic and flow passages are smooth and polished.

Figures 8, 8A, 8B:
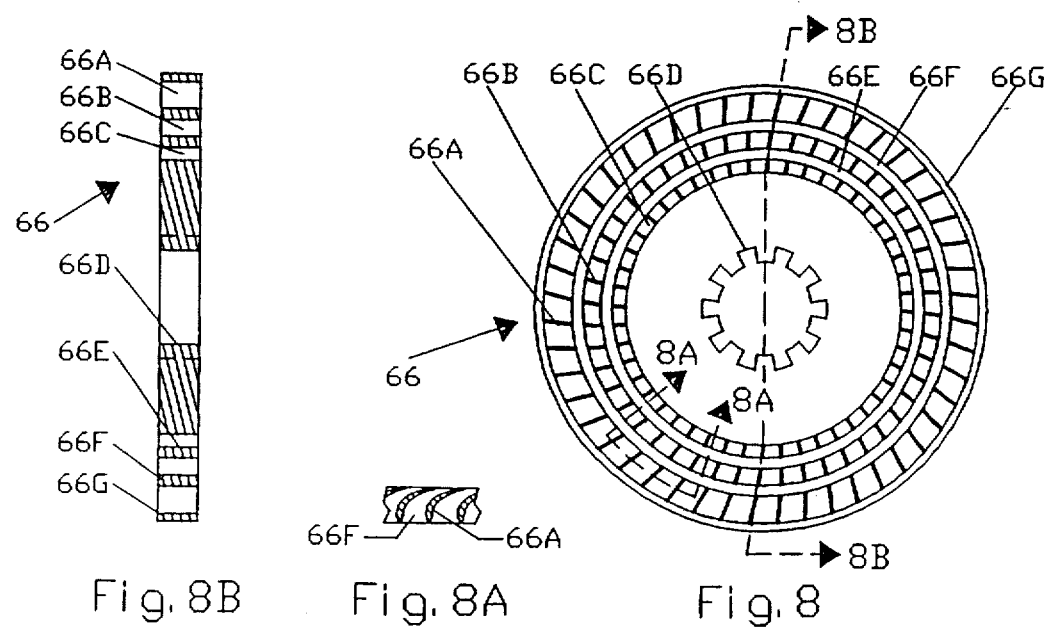
FIG. 8 is the side view of a first turbine wheel.
FIG. 8A is a partial cross-sectional view taken along the line 8A—8A in FIG. 8.
FIG. 8B is a cross-sectional view taken along the line 8B—8B in FIG. 8.

FIGS. 8, 8A and 8B show details of energy converting, first turbine wheel 66. Co-annular turbine blade rings 66A, 66B and 66C are sized to accommodate the co-annular, high velocity, low pressure, medium pressure, and high pressure gas streams respectively. On the outlet side, ring 66A is aligned with an open area, ring 66B is adjacent to the low pressure vanes, and ring 66C is adjacent to the medium pressure vanes of the second nozzle plate. A spline 66D secures the wheel to the main shaft. Shroud rings 66E, 66F and 66G separate and seal the flow passages, and provide structural continuity. Entire wheel 66 is fabricated into a one piece assembly from high temperature alloys or ceramics. Individual turbine blade airfoils are designed in the manner of axial flow prior art. Flow passages are smooth and polished.

FIGS. 9, 9A and 9B show details of second gas nozzle plate 48. An annular opening 48A is in line with exhaust from the first turbine wheel. Nozzle vane rings 48B and 48C are arranged in co-annular patterns which direct high velocity gas to the second turbine wheel low pressure and medium pressure stages respectively. The nozzle vane airfoils are designed and manufactured in the manner of axial flow prior art. A counterbore 48D positions the output shaft bearing. Solid rings 48E and 48F separate and seal flow passages. Liner 120 is attached to the second nozzle plate. Struts 48G provide structural continuity and are placed to minimize flow restrictions. Entire second nozzle plate 48 is fabricated into a one piece assembly from high temperature alloys or ceramics. Flow passages are smooth and polished.

FIGS. 10, 10A and 10B show details of energy converting, second turbine wheel 68. Co-annular turbine blade rings 68A and 68B communicate with the low pressure and medium pressure nozzle rings respectively, on the inlet side. On the outlet side, ring 68A discharges to the exhaust stream and ring 68B discharges to the low pressure nozzle. A spline 68C secures the second turbine wheel to the output shaft. Shroud rings 68D and 68E seal the flow passages, and provide structural continuity. The entire second turbine wheel is fabricated into a one piece assembly from high temperature alloys or ceramics. Turbine blade airfoils are designed in the manner of axial flow prior art. Flow passages are smooth and polished.

Figures 11, 11A, 11B:
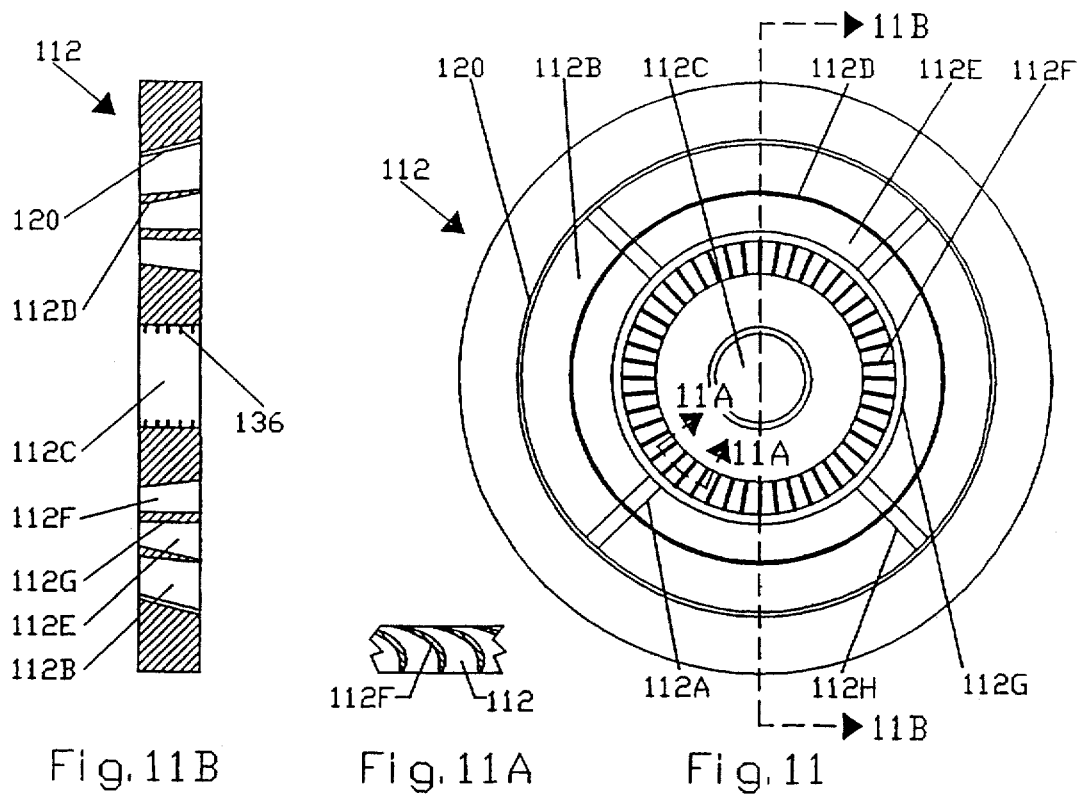
FIG. 11 is a side view of a third gas nozzle plate.
FIG. 11A is a partial cross-sectional view taken along the line 11A—11A in FIG. 11.
FIG. 11B is a cross-sectional view taken along the line 11B—11B in FIG. 11.

FIGS. 11, 11A and 11B show details of third gas nozzle plate 112. Coaxial openings 112B and 112E are in line with exhaust streams from the first and second turbine wheels. A coaxial nozzle vane ring 112F is sized to accelerate gases for the third turbine wheel low pressure stage. The nozzle vane airfoils are designed and manufactured in the manner of axial flow prior art. Labyrinth seal 136 is installed in a center bore 112C. Solid rings 112D and 112G separate and seal flow passages. Liner 120 is attached to the nozzle plate. Struts 112A and 112H provide structural integrity and are placed to minimize flow restrictions. The third nozzle plate is fabricated into a one piece assembly from high temperature alloys or ceramics. Flow passages are smooth and polished.

Figures 12, 12A, 12B:
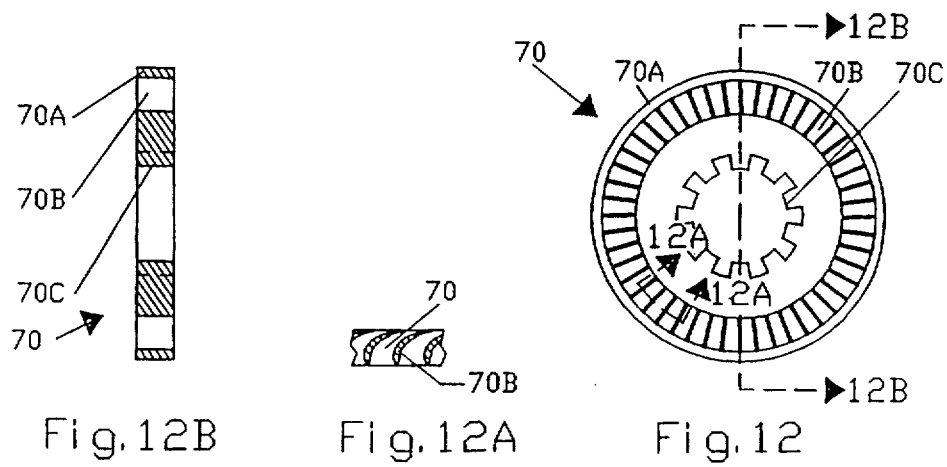
FIG. 12 is a side view of a third turbine wheel.
FIG. 12A is a partial cross-sectional view taken along the line 12A—12A in FIG. 12.
FIG. 12B is a cross-sectional view taken along the line 12B—12B in FIG. 12.
Figure 14:
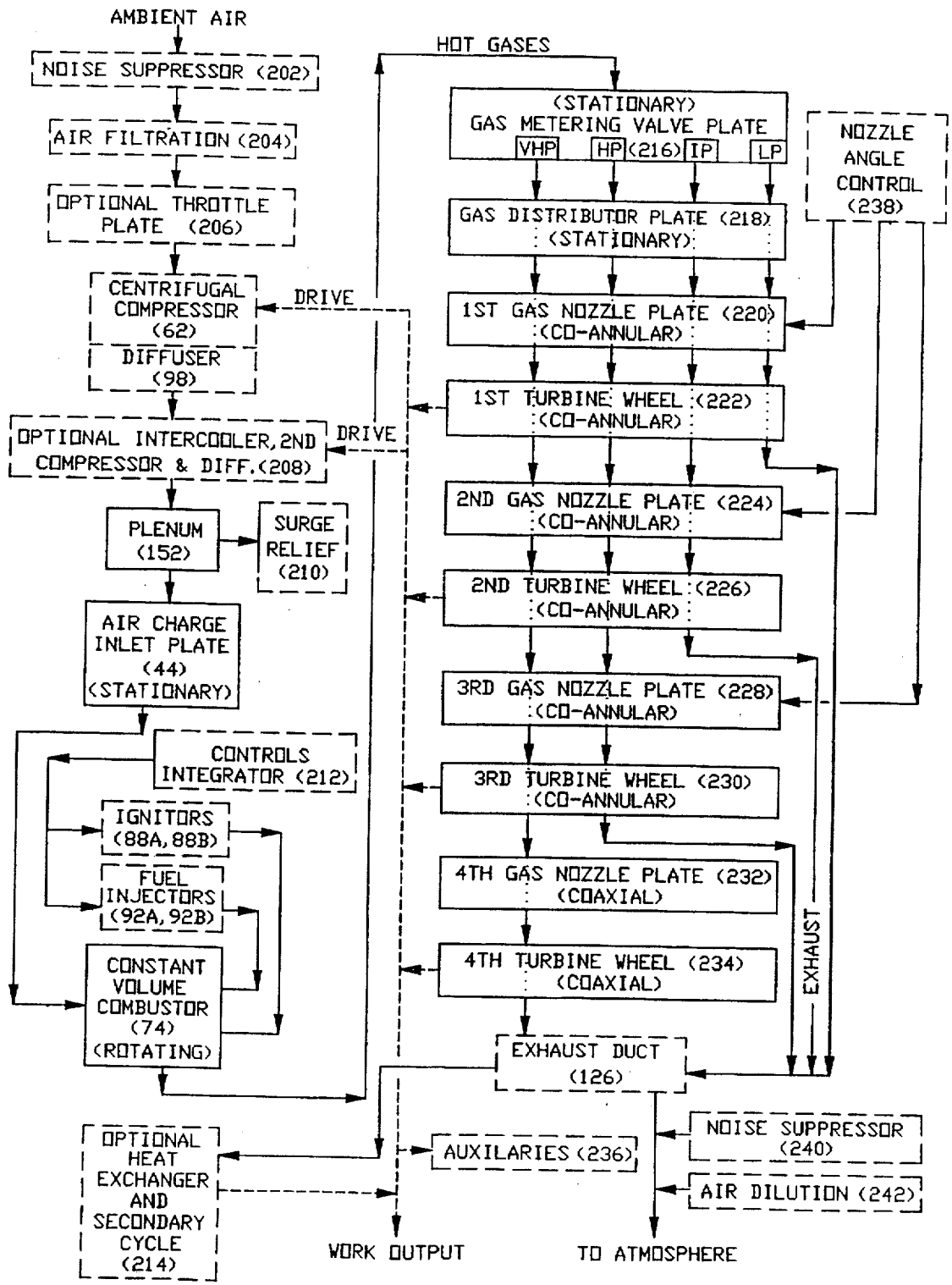

FIGS. 12, 12A and 12B show details of energy converting, third turbine wheel 70. A coaxial turbine blade ring 70B communicates with the nozzle ring on the inlet side. Turbine blade airfoils are designed in the manner of axial flow prior art. On the outlet side, ring 70B is in line with an open area. A spline 70C secures the third turbine wheel to the output shaft. A shroud ring 70A provides structural continuity. The third turbine wheel is fabricated into a one piece assembly from high temperature alloys or ceramics. Flow passages are smooth and polished.

Figure 13A:
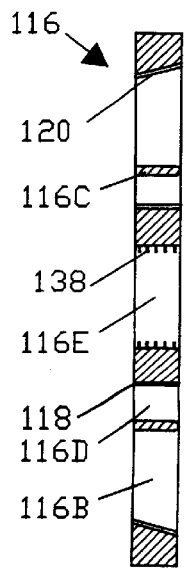
FIG. 13A is a cross-sectional view taken along the line 13A—13A in FIG. 13.
Figure 13:
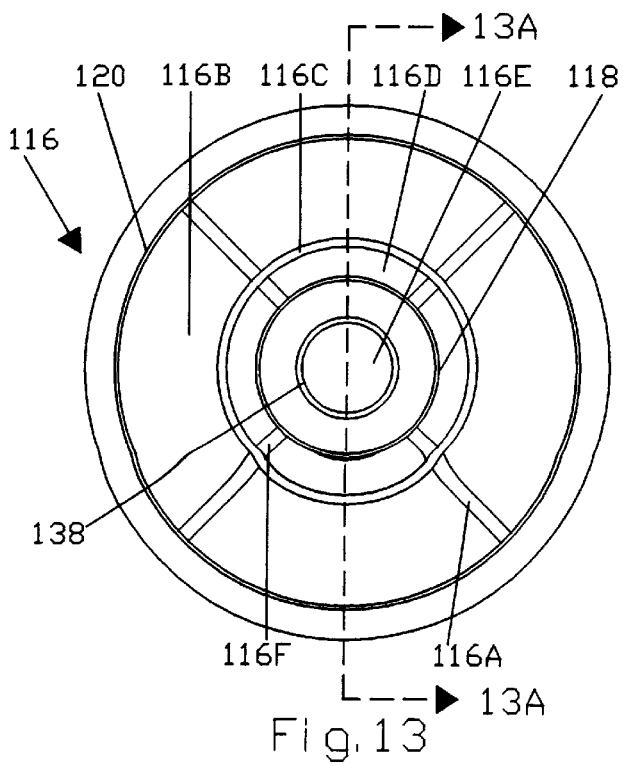
FIG. 13 is a side view of an exhaust gas guide.

FIGS. 13 and 13A show details of exhaust gas guide 116. Struts 116A and 116F provide structural integrity and are designed to minimize flow losses. Open areas 116B and 116D are separated by a circular streamline guide 116C. Labyrinth seal 138 is attached to a centerbore 116E. Parts of exhaust torus 118 and liner 120 are connected to the guide. The entire gas guide is fabricated into a one piece assembly from high temperature alloys or ceramics. Flow passages are smooth and polished.

FIG. 14 flow diagram is a ramification of the basic cycle and is described hereinafter.

Figure 15:
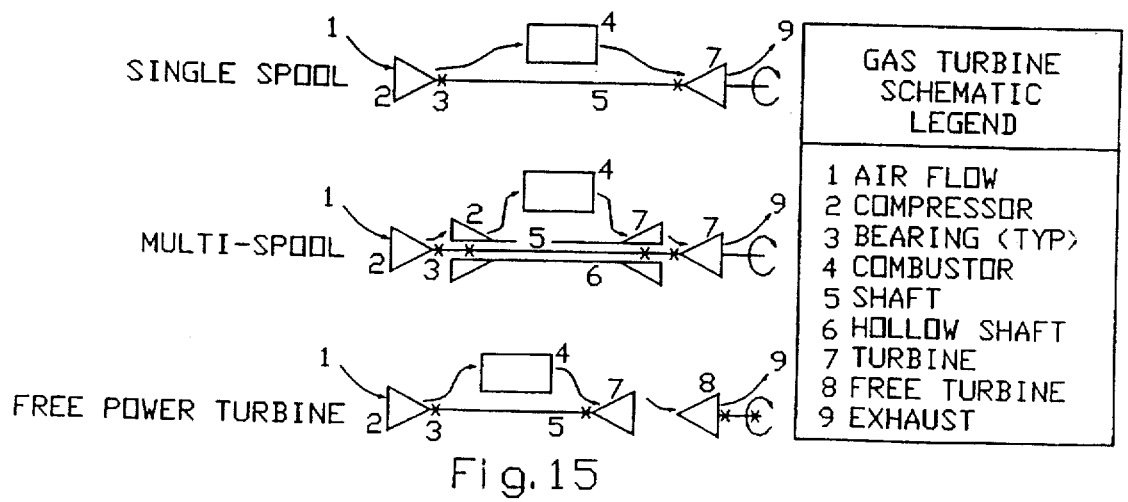
FIG. 15 is schematic representation of various turbine configurations.
Figure 6A:
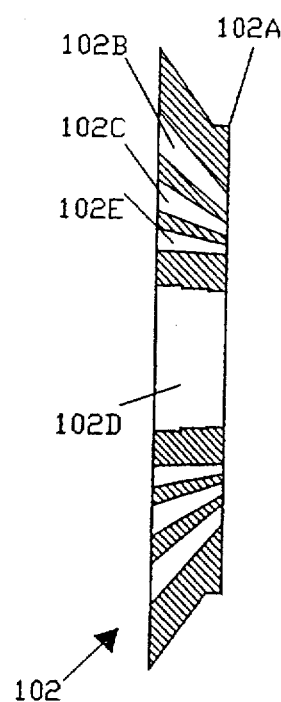
Figure 6:
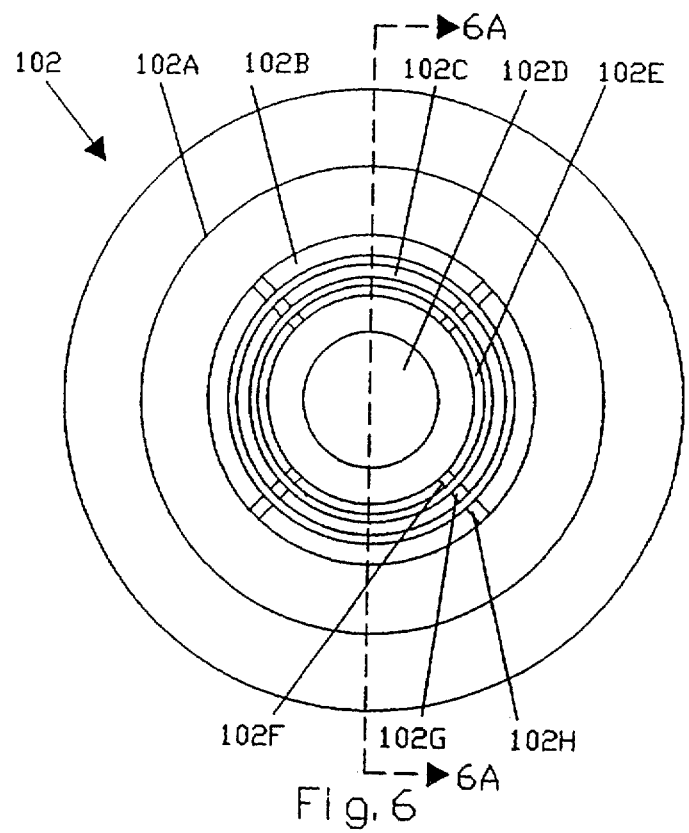
Figure 13A:
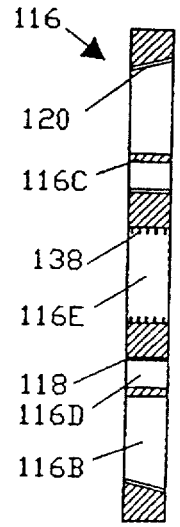
Figure 13:
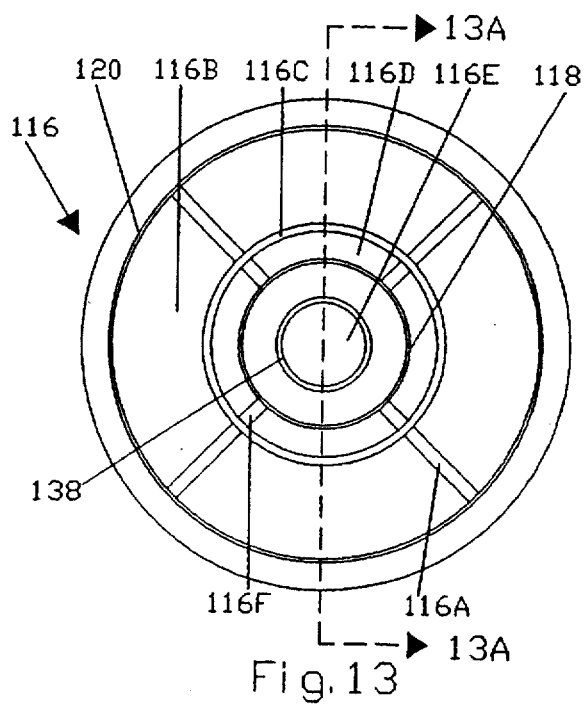

FIG. 15 turbine configurations include the preferred embodiment of the CVCPFT as a free power turbine (separate shaft for power output turbine wheels). Other possible arrangements of the CVCPFT include single spool (one shaft), and multi-spool configurations (a plurality of coaxial shafts). The free power turbine configuration is shown in FIG. 2A. Different applications require certain configurations for best performance, highest efficiency, or lowest first cost considerations.

Operation of Invention

The CVCPFT is started by rotating the unit with a starter motor and providing ignition to a predetermined air-fuel mixture. Air and fuel flow are increased to obtain power to accelerate (or to provide power for work). Air and fuel flow are reduced to lower speed, and are shut off to terminate operation. The same liquid and gas fuels and their prior art systems used in existing engines are used herein.

A block diagram flow chart of the CVCPFT is shown in FIG. 1. This diagram shows the general thermodynamic cycle process with main members and functions represented. Prior art gas turbine components included in the diagram are represented by dashed line blocks: numbers 62, 88A, 88B, 92A, 92B, 98 and 126. Stationary inlet plate 44 intermittently supplies compressed air to the inlet side of rotating constant volume combustor 74. A combustible mixture ignites in the chambers of rotating combustor 74 which has the discharge side periodically blocked by stationary valve plate 46. The valve plate divides the combustion gas into three parallel streams of high pressure, intermediate pressure and low pressure gas and routes the gas to distributor plate 102. FIG. 1 shows the gases then flowing in three co-annular streams through coaxial and annular gas nozzle plates 48, 104 and 112, and coaxial and annular turbine wheels 66, 68 and 70, and through exhaust duct 126 to atmosphere.

Referring to FIG. 2A, the CVCPFT is started by turning a key lock or closing a switch which will activate a prior art control system and starting system (represented by the auxiliaries block), rotating main shaft 24 by auxiliaries drive spider 60. Ambient air is drawn through bellmouth 22 by centrifugal compressor 62. When a predetermined rotational speed is reached, the prior art ignition system and the prior art fuel system will activate, providing combustion and bringing the gas generator (members connected to main shaft 24) up to speed. The main shaft now rotates compressor 62, auxiliaries drive spider 60, combustor shaft 36 and combustor 74 at idle speed. The slow rotation of combustor 74 enhances 1) the speed changing flexibility of the gas generator assembly, 2) low energy loss due to combustor sliding friction contact, 3) thermodynamic characteristics of the process. The optimum rotational speed provided also produces maximum output of combustion gases, while allowing adequate time for ignition and complete combustion. Location of the combustor rotor upstream-side anchor point and selection of low thermal expansion material will minimize air and gas leakage, and can virtually eliminate sliding friction at the rotating seals. Slow rotation of the combustor at idle and full load settings also allows sufficient time to inject fuel through ports 74A, FIG. 4. In FIG. 2A, compressor 62 and air diffuser 98 will operate as in prior art, supplying compressed air to plenum 152. The plenum is formed by the relatively large cavity upstream of inlet plate 44. Air is fed from the plenum through inlet plate 44 into combustor 74. Two chambers are charged simultaneously at 180 degree spacing, enabling the operation of two simultaneous combustion cycles. Output shaft 26 remains stationary until a power output is required, at which time the prior art fuel system increases fuel flow causing the main shaft to increase speed and the output shaft to rotate producing torque and power. Main shaft 24, FIG. 2A, rotates in the range of 50,000 RPM at full speed, and separate output shaft 26 rotates at the speed required by the driven load up to approximately 50,000 RPM. Power is delivered by means of output drive spider 72.

Combustor 74 rotates slowly, (in the range of 200 RPM at full speed), mounted on hollow combustor shaft 36 and driven by gears 64, 76, 78, 80, 82A and 82B, FIG. 2A. As combustion chambers 74E–74T, FIG. 4, rotate through 180 degrees, a full combustion cycle is completed in each chamber, resulting in two complete cycles per chamber per revolution of the combustor. The process status of each combustion chamber 74E–74T is determined by its angular position relative to inlet plate 44 and valve plate 46 as the combustor rotates 36 degrees between cycle steps:

1. Combustion chamber receives compressed air and partial purging at the 0 degree position.
2. Chamber receives fuel injection and ignition after rotating approximately 36 degrees.
3. Combustion occurs during 36 degrees of rotation.
4. Chamber releases "high pressure combustion gases" at approximately 72 degrees.
5. Chamber releases "medium pressure combustion gases" at approximately 108 degrees.
6. Chamber releases "low pressure combustion gases" at approximately 144 degrees.
7. Chamber then receives compressed air and partial purging at the 180 degree position, starting its second cycle during a single rotor revolution, and repeats the above steps.

The above three pressure steps (high—95 psi, medium—51 psi, and low—28 psi, all approximate) result from a chamber pressure of approximately 100 psi obtained by constant volume combustion. The terms "high", "medium", and "low" pressure are all relative. The CVCPFT will accommodate much higher pressures than listed. As in Brayton cycle turbines, the CVCPFT requires more turbine stages for higher turbine pressure ratios. For example, large Brayton power turbines have overall pressure ratios of 25 to 1 or higher, requiring a large portion of generated power to be used for cycle air compression. The CVCPFT will generate high pressures in the combustion chambers, saving much of the energy required for Brayton air compression. There is actually a loss of pressure in the Brayton cycle combustors. A 25 to 1 ratio in the CVCPFT will require five turbine stages. The three pressures listed above correspond to the "simple basic cycle" used herein for the purpose of clarifying drawings and descriptions.

At a nominal full load combustor speed of 200 RPM, using the basic CVCPFT configuration, there will be one hundred and six (106) high pressure, 106 medium pressure and 106 low pressure flow pulses per second delivered to the turbine wheels calculated as:

(16 chambers) times (2 combustion cycles per combustor revolution) times (200 revolutions per minute) divided by (60 seconds per minute) equals (106 cycles per second).

The high frequency of combustion pulses, analogous to AC electricity, is partly responsible for high process efficiency, providing a virtual continuous flow of power to the turbine wheels. Combustion gases flow from the combustor through valve plate 46 and distributor plate 102, "leveling" gas pressure as flow proceeds to the restricted openings of first gas nozzle plate 104, FIG. 2A. Although this is a closed combustion process, which by definition is a discontinuous process, gas flow to the turbine wheels will be of a virtually continuous nature due to the large number of combustion cycles per second generated mechanically by the combustor's rotation. This is important, as it permits the gas accelerating nozzle plates and the energy converting turbine wheels to be operated at predetermined pressure ranges, resulting in high turbine efficiency. Notwithstanding the high frequency (106 cycles per second) flow of combustor output, the time available for each individual combustion cycle is approximately five times greater than the corresponding time in some piston engines. The relatively long time period available for each step assures process completion and contributes to high thermal and mechanical efficiency.

As the combustion chambers rotate past each of the valve plate ports, chamber pressure level drops a predetermined amount. This results in three parallel gas flow streams, each at different pressure levels. Difference in pressures between adjacent streams are set at a pressure ratio of approximately 2 to 1, which corresponds to the most efficient generation of velocity by the nozzle plates. At maximum speed and power output, pressures are predetermined and are controlled by the relatively small size of the nozzle vane rings' exit areas. All of the turbine wheels and nozzle plates are configured to match predetermined pressures and temperatures available to them. (At air compressor speeds lower than design, pressures decrease, and as in all gas turbines the performance falls off. The efficiency of the CVCPFT does not decrease as much as present turbines, as gas pressure increases are generated by the closed combustion process. To obtain maximum efficiency at less than design speed, prior art variable geometry nozzles may be incorporated.) Each of the three pressure level gases are smoothly routed into and through large co-annular passages of distributor plate 102 and into three separate nozzle rings of nozzle plate 104. The three gas streams are kept separated as they flow co-annularly through the downstream turbine wheels and the nozzle plates until all spent gases merge together into a combined exhaust stream at similar velocities, similar pressures and similar temperatures as follows:

High pressure gas flow stream No.1 is accelerated through first nozzle vane ring 104C, FIG. 7; is channeled into first turbine blade ring 66C, FIG. 8; and emerges into medium pressure vane ring 48C of second gas nozzle plate 48, FIG. 9. Flow stream No.1 is then accelerated into second turbine blade ring 68B, FIG. 10; and emerges into low pressure vane ring 112F of third gas nozzle plate 112, FIG. 11. Stream No.1 then accelerates into third turbine blade ring 70B, FIG. 12; emerges at exhaust pressure level; passes through coaxial opening 116D, FIG. 13; and mixes with exhaust gas streams No.2 and No.3.

Medium pressure gas flow stream No.2 is accelerated through first nozzle vane ring 104B, FIG. 7; is channeled into first turbine blade ring 66B, FIG. 8; and emerges into low pressure vane ring 48B of second gas nozzle plate 48, FIG. 9. Flow stream No.2 is then accelerated into second turbine blade ring 68A, FIG. 10; emerges at exhaust pressure; passes through coaxial opening 112, FIG. 11; and mixes with exhaust from stream No.3. Gas flow stream No.2 does not pass through third turbine wheel 70, FIG. 12.

Low pressure gas flow stream No.3 is accelerated through first nozzle vane ring 104A, FIG. 7; is channeled into first turbine blade ring 66A, FIG. 8; emerges at exhaust pressure and flows to a point where it mixes with exhaust gas from streams No.1 and No. 2. Gas flow stream No. 3 bypasses turbine wheels 68 and 70, going through the open areas in the downstream nozzle plates.

The above gas flow process is designed to provide maximum velocity from each of the nozzle plates with an approximately 2 to 1 pressure ratio. This is a continuous flow of high frequency pressure pulses which have a relatively small pressure wave amplitude due to the position and function of the valve plate passages. The pressure wave amplitude decreases even further due to the "smoothing effect" as gases progress through turbine components. The actual values of the "medium pressure" referred to above will be the same whether furnished by expanding gas in the combustion chambers or resulting from gas exiting turbine blade ring 66C, FIG. 8. In the same token, the actual value of the "low pressure" referred to above will be the same whether furnished by expanding gas in the combustion chambers, or resulting from gas exiting turbine blade ring 66B, FIG. 8. Equal pressure values exiting from the combustor and the turbine wheels permit merging gas streams to minimize turbulence at confluence of streams.

Although the above descriptions contain many details, they should not be construed to limit the scope of the invention, but as merely providing illustrations of some of the presently preferred embodiments of this invention. Thus the scope of the invention should be determined by the appended claims and their legal equivalents rather than by the examples given.

Accordingly, as the reader can see, my gas turbine has a high potential for a variety of uses. Applications of the invention include stationary electrical power generation and cogeneration; prime mover for pumps, compressors and machinery; auto, boat, train, and airplane engines; and wherever a large source of motive power is required. Elimination of the expensive Brayton cycle heat regenerator, with its inherent leakage and blockage problems, will cut costs and improve reliability in automotive applications. Fuel economy without a regenerator is much improved over gasoline reciprocating engines.

Manufacturing of relatively low operating temperature parts such as the housing and air swept components has been well established by prior art. High combustion temperatures are required for high efficiency in gas turbines. Existing alloys and ceramics presently in use or currently under development will be adequate for high temperature components in the CVCPFT. Prior art cooling and lubrication systems can be incorporated into selected components. Many of the present gas turbine and reciprocating engine manufacturing methods can be used when producing the CVCPFT.

Special purpose modifications can be incorporated for improved operation in customized applications. Constant high speed, constant low speed or variable speed of output shaft 26, FIG. 2A, can be provided. Valve plate 46, distributor plate 102 and nozzle plate 104, FIG. 2A, can be combined and manufactured in one piece, or in a combination of two pieces. Materials different than indicated under "Description—FIGS. 1 to 15", but of a suitable nature, can be substituted for various components. Additional or fewer prior art labyrinth seals can be incorporated in custom applications. Many different sizes and power ratings may be designed. Components of housing, structural supports, insulation blocks, liners, and others can also be combined or separated. The turbine wheels can be fabricated without shroud rings in some cases.

The number of individual chambers 74E–74T in combustor 74 may be varied, and the rotational speed may be changed. In addition, the number of complete cycles per revolution of the combustor may be changed by modifying the number of passages in valve plate 46. Changes are made for specific applications. The ignitor and the fuel injectors' location and geometry can also be modified for specific applications.

Description and operation—FIG. 14.

A three stage turbine is used in the preceding to describe the basic unit. FIG. 14 illustrates the flow chart of a four pressure stage unit with four sets of nozzle plates and turbine wheels, items 220 through 234, supplied with four parallel gas streams from a valve plate 216. Components having identification numbers repeated from FIG. 1 perform functions previously described. Very high pressure, high pressure, intermediate pressure and low pressure stages of co-annular gas streams issue from a distributor plate 218. Higher turbine inlet temperatures require higher pressures to effectively utilize the available energy released. The higher pressures in turn require more turbine stages to efficiently convert gas energy into useful work. My turbine can utilize any range of contemporary temperatures and pressures by incorporating the optimum indicated number of turbine wheels. Higher turbine inlet temperatures may be possible in the CVCPFT due to intermittent cooling of the combustor by incoming air. Pressure levels of the combustor discharge will be designed to match the discharge pressure values of the turbine wheels.

Prior art modifications and features represented by the dashed blocks in FIG. 14 can be added to the CVCPFT. Noise suppressors 202 and 240, at the air inlet and the exhaust duct, are desirable options. Air filtration 204 at the compressor inlet will reduce wear of expensive parts and prevent clogging of small openings and clearances. A throttle plate 206 on the compressor inlet will function as on automobile engines, although requiring careful design to prevent air turbulence at the inlet. On higher pressure units, dividing the air compression process into two stages with an air intercooler and a diffuser 208 between stages will improve efficiency, at a higher manufacturing cost. A surge-relief valve 210 on the compressor discharge could be a necessary component on many applications. A prior art controls integrator 212 can be used to schedule and operate automatically the basic and optional features, and will function similar to prior art on-board computers present in automobiles.

Variable nozzle angle control or variable geometry nozzles 238, FIG. 14, can be added at extra cost using designs developed in prior art. This option will improve part load efficiency, and provide engine braking capability. Air dilution 242 of exhaust gases can be incorporated where low temperature exhaust is desirable. Auxiliary equipment 236 such as starters, generators, oil pumps, fans, lubrication systems, cooling systems, and speed controls will normally be connected to main shaft 24, as indicated in FIG. 2A.

In large installations, or applications where highest possible efficiency is required, a secondary cycle 214, FIG. 14, can be used in combination with the CVCPFT. This secondary thermodynamic cycle duplicates many components of the CVCPFT cycle, but instead of using the constant volume combustor, an exhaust gas heat exchanger (included in block 214) takes its place. A constant pressure turbine cycle is required by heat exchanger use in the secondary machine. Compressed air in the secondary cycle receives heat (energy) from the CVCPFT turbine's exhaust for driving the secondary turbine assembly. This compound or dual cycle includes two housings and two major assemblies, each having a compressor, nozzles, turbine wheels, and output shaft. The two output shafts may be coupled together by gearing. The compressor pressure ratios are set to obtain maximum efficiency matching the turbine inlet temperatures in each machine. Conventional annular flow components, instead of co-annular flow, are used in the secondary cycle. Higher installation cost of the secondary cycle addition is offset with fuel savings.

Different types of exhaust gas heat recovery equipment can be incorporated with the CVCPFT to provide other combined cycles, including generation of steam for use in steam turbines or in heating and air conditioning equipment.

Theoretical energy efficiency.

Higher turbine inlet temperatures result in higher efficiency. The constant volume process heat capacity (also referred to as specific heat) of a gas is a lower value than its constant pressure process heat capacity. This means that less fuel is required to reach a given turbine inlet temperature in a constant volume process by the ratio of approximately 3 to 4. This is not a complete saving of fuel though, because in operation of existing Brayton (constant pressure process) turbines the gases are continually moving from combustor toward the turbine nozzle, but in a constant volume process part of combustion energy must be used to accelerate gases toward the first turbine nozzle plate. This reduces some of the initial gain received due to less fuel required by constant volume combustion for a given temperature. (The fluid motion toward the first nozzle plate is a form of flow energy represented by the product of pressure times specific volume in the energy units (enthalpy) of a substance.) After passing through the first turbine wheel, gases in either type of turbine are moving at roughly the same velocity, other things being equal. At this point the higher temperature and higher pressure of the constant volume process can produce higher efficiencies if there are gases available for a continuous flow through the turbine wheels. If there is only an intermittent gas flow, nozzle pressures and velocities will have large corresponding fluctuations, making smooth, efficient turbine operation practically impossible. That is where the CVCPFT has a big advantage, by mechanically providing approximately 106 cycles or pulses per second, resulting in a continually "backed" or virtually continuous flow of gases. The CVCPFT can in this way take advantage of the higher available energy that is provided by a higher temperature for a given amount of fuel by constant volume combustion, and provide a corresponding higher efficiency.

Another advantage of the CVCPFT is the ability to use the high pressure that can be available from a constant volume combustion process in an efficient manner. By valving off combustor 74 discharge in manageable and efficient steps, there is little pressure wasted in useless turbulence due to higher than required pressure differences across the gas nozzle plates. This efficient stepped discharge of the combustor can be provided only where constant volume process combustion gases exit in a plurality of sequential flow streams. One set of fixed tandem or series nozzles and wheels cannot address more than one pressure level without resulting in turbulence or off-design nozzle performance.

Glossary airfoil—streamline configuration of a structure's cross-section.

annular—space between inner and outer cylinders or rings.

arcuate—a curved shape.

available energy—that portion of energy release which can actually be used.

bellmouth—an opening with smoothly curving and converging walls.

Brayton Cycle—a process igniting a compressed air and fuel mixture in semi-open burner(s) which furnish expanded gas to turbine nozzles and wheels for work production.

co-annular—a plurality of concentric annulations; two or more hollow, cylindrical shapes, with one or more surrounding the central coaxial cylindrical shape; a plurality of coaxial, annular passages or flow streams.

constant pressure combustion—obtained by burning fuel in an open or semi-open container.

constant volume combustion—obtained by burning fuel in a closed container.

CVCPFT—Constant Volume Combustion Plurality Flow Turbine; a gas turbine engine with unique, multiple, gas flow streams.

Efficiency (%)—100 times the quotient of output energy units divided by input energy units.

enthalpy—a measure of thermal properties in a unit of substance.

free power turbine—a turbine with separate compressor shaft and output shaft.

gases—products of air and fuel combustion.

heat capacity—(specific heat), the number of heating units required to raise the temperature of one unit of a substance by one degree.

labyrinth seal—a group of thin structures providing a convoluted, restrictive, fluid pathway.

pressure—static pressure (as opposed to total pressure).

psi—a measure of pressure; pounds per square inch.

rpm—a measure of rotational speed; revolutions per minute.

specific power—a measure of power provided by a unit of volume; KW per liter.

specific volume—a measure of unit volume per unit weight; cc per gram.

spool—a turbine sub-assembly comprising compressor, shaft and turbine wheel(s).

velocity—a vector quantity defined by speed and direction.

volumetric efficiency—a measure of actual mass of air compared to an ideal mass of air.

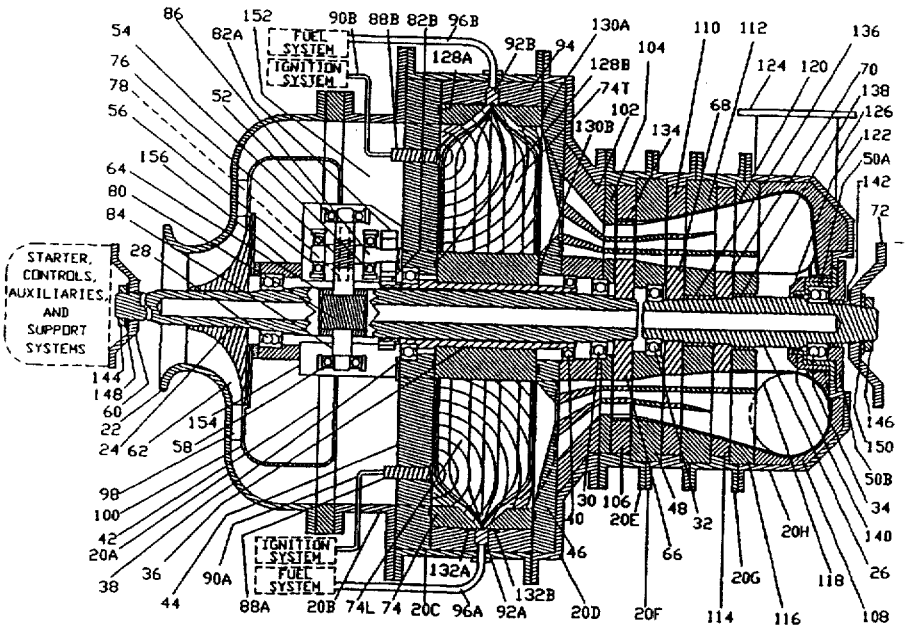

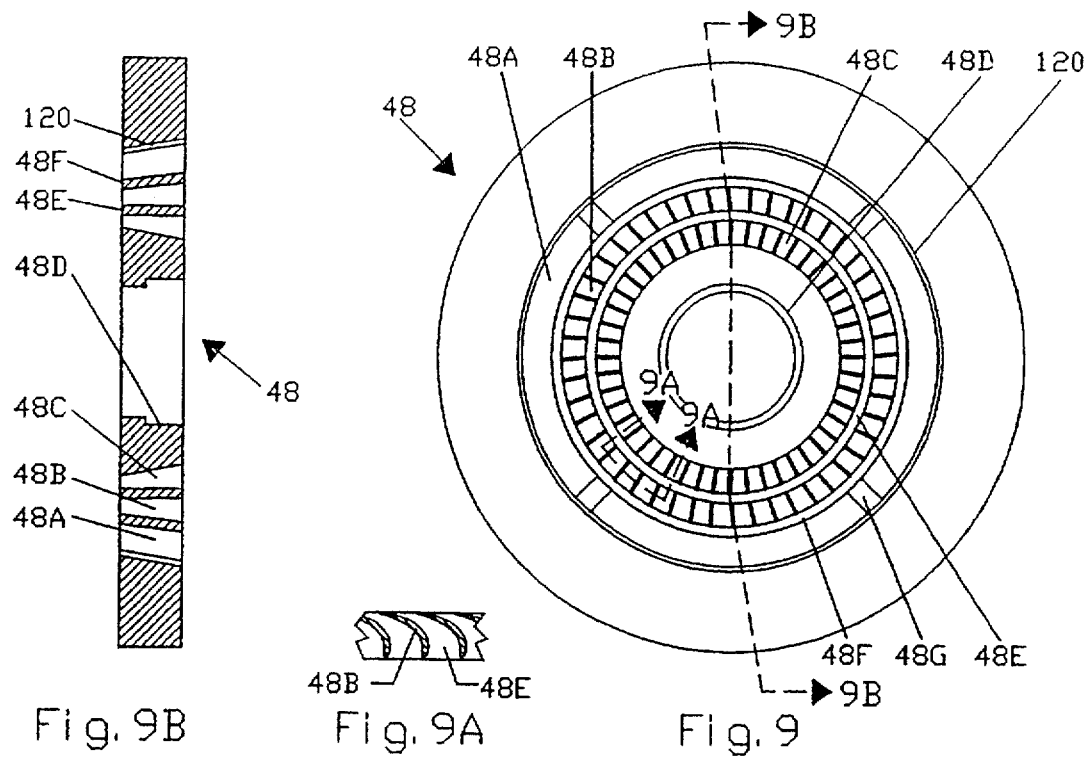
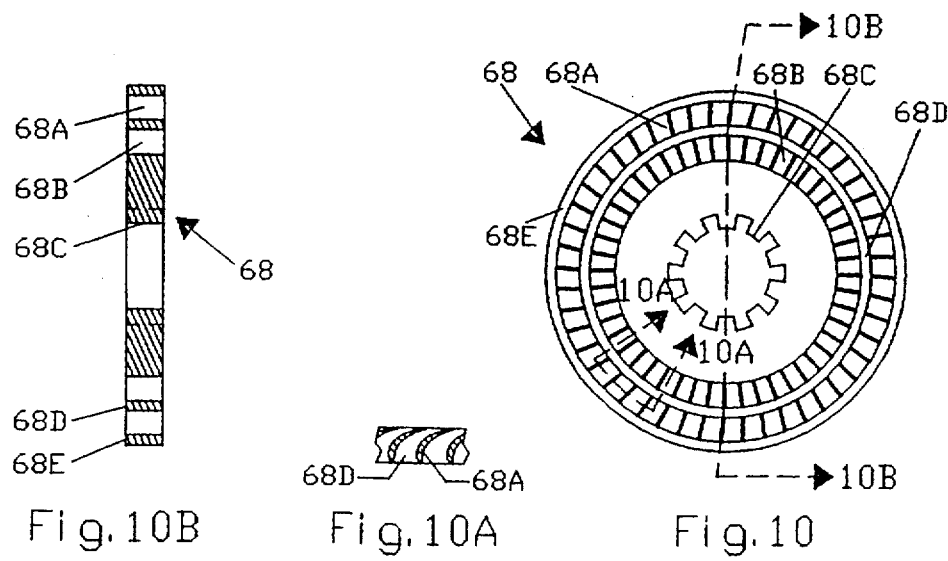

I claim:

1. A gas turbine engine having a housing, air compressor, bearings, seals, fuel system, ignition system, and starter; the improvements juxtaposed coaxially in a direction of gas flow and in the following order comprising:

(a) a stationary flat and circular combustor air inlet plate having one or more elongated openings positioned for regulating combustion air from said air compressor and incorporating means for securing combustion ignitors;

(b) a rotating combustor having multiple substantially triangular shaped combustion chambers in a cylindrical drum shaped rotor, said chambers intermittently sealed on an upstream side by said inlet plate, said fuel and ignition systems generating gases by constant volume combustion in said combustor mounted on a combustor shaft rotated by a gear train reducing speed from a main turbine shaft;

(c) a stationary flat and circular valve plate having a plurality of elongated inlet openings angularly spaced and shaped to intermittently communicate with said combustion chambers, said valve plate inlet openings dividing said combustor discharge gas into multiple flow streams as individual said combustion chambers rotate past each said opening which transmits said flow streams through internal passages tapering to outlet areas, said valve plate intermittently sealing said chambers of said combustor in cooperation with said air inlet plate;

(d) a stationary flat and circular distributor plate having multiple coaxial and annular passages, said distributor plate passages aligned with said outlet area of said valve plate on one side and aligned with nozzle blade rings on an opposite side, said annular passages converting concentrated gas flow streams into multiple, annular streams;

(e) a plurality of stationary flat, circular nozzle plates, an upstream of said nozzle plates incorporating three or more concentric rings of nozzle vanes alternating with concentric solid rings, each following of said nozzle plates incorporating one less of said concentric nozzle vane rings, and each said nozzle plate accelerating said gases received from said distributor plate to substantially acoustic velocity;

(f) a plurality of flat, circular turbine wheels incorporating multiple concentric rings of turbine blades separated by concentric solid rings, said turbine wheels being interposed between adjacent nozzles plates, the number of said turbine blade rings in said turbine wheels equal to the number of matched vane rings in each said nozzle plate preceding each said turbine wheel receiving said gases from said nozzle plates, said turbine wheels attached to said main shaft driving said air compressor and said gear train, additional said turbine wheels driving an output shaft;

said stationary improvements fixed into said housing which contains all improvements integrated with said turbine components in a manner providing a low pressure loss functioning device, and said improvements producing three or more separate coaxial and annular gas streams whereby said gas turbine utilizing said improvements can convert energy of constant volume combustion into useful rotational power.

2. The turbine engine of claim 1 wherein said combustion air inlet plate having a round clearance hole for said shafts and said inlet plates elongated openings through said flat plate having an elongated dimension extending in a radial direction and equal in length to a radial dimension of the combustion chambers, an inlet plate openings minimum dimension being less than a width of a rotors interfacing flat land between said combustion chambers facilitating sealing of said chambers, said openings angular location and number thereof establishing the duration and number of combustion cycles produced by each said combustion chamber during one revolution of said combustor rotor, said inlet plate providing a smooth sealing surface for intermittently sealing an inlet end of said combustion chambers, said inlet plate incorporating circular labyrinth seals for sealing a side facing said combustor, said inlet plate incorporating one or more threaded holes for securing ignitors extending through said inlet plate, said ignitors communicating with a combustible mixture in said combustion chambers;

said combustors cylindrically shaped rotor having flat and parallel ends and diameter in the range of 2 to 9 times a distance between said flat ends, a means for securing the rotor to said combustor shaft that is hollow and coaxial with a main shaft, said rotor having a smooth and polished periphery continuously in contact with two sets of stationary labyrinth seals supported by said housing, said rotor having flat and straight lands between said combustion chambers on both ends of said rotor, said lands of sufficient width to provide sealing functions in cooperation with adjacent flat surfaces, said combustion chambers substantially triangular in section transverse to said combustor shaft and having a truncated apex toward said shaft center with fillets at planar junctions, said chambers arranged at equal distances from said combustor shafts center and said combustion chambers having walls extending a length of said rotor, the number of said chambers set at sixteen or more for production of the highest frequency of combustion cycles consistent with design constraints, said combustor having a conical opening for fuel injection from said fuel system into each said combustion chamber as said rotor periphery passes the injectors.

3. The turbine engine of claim 1 wherein said gear train comprising two driving worm gears, two driven worm gears and a set of helical gears arranged on gear shafts with said bearings supported in said housing, said gear shafts juxtaposed with said main shaft and said combustor shaft, said main shaft fitted with the initial driving worm gear and said combustor shaft fitted with the final drive helical gear, said main shaft positioned inside of said hollow combustor shaft with both ends extending beyond thereof, said turbine wheels fixed to one end and said compressor fixed to the other end of said main shaft, said gears converting high speed rotational motion of said main shaft at approximately 50,000 revolutions per minute to an optimum speed range of said combustor shaft at approximately 200 revolutions per minute.

4. The turbine engine of claim 1 wherein said valve plate incorporating a central shaft clearance hole and a plurality of specially shaped said inlet ports arranged at angles determining cycle steps pressure, said inlet port elongation equal in length to a combustion chamber dimension in a radial direction, a valve plate opening minimum dimension being less than a width of a flat land between said combustion chambers to facilitate sealing of said chambers, each said valve plate passage having a substantially rectangular and arcuate exit area positioned with a longest dimension in circumferential direction and communicating with a matching annular opening in said distributor plate on a downstream side, said passages having smooth internal walls which slope from inlet to outlet with minimum flow restriction, whereby the passage walls originating at and perpendicular to a small dimension of said inlet gradually diverging to terminate at a maximum dimension of said passage outlet, and the passage walls perpendicular to and originating at a maximum dimension of said passage inlet gradually converging to terminate at a minimum dimension of said outlet, said valve plate intermittently sealing a discharge side of said combustor and also providing intermittent release of separate streams of said gases to said distributor plate;

said distributor plate comprising rings of various diameters transverse to the direction of gas flow and having smaller said rings placed concentrically in a next larger ring, said rings having flat and parallel sides, the distance between said sides being equal in all rings, said rings attached to one another with radial struts to form a one piece flat plate having tandem counterbores for shaft bearings, said rings also sized and spaced to form converging, coaxial and annular flow passages between them connecting said valve plate openings with said nozzle plate, the number of said annular flow passages equal to the number of flow streams received from said valve plate, said annular flow passage exit areas exactly coinciding with said nozzle plate blade rings, said distribution plate solid rings having flat surfaces transverse to said gas flow sealing gas leakage in cooperation with juxtaposed component flat surfaces.

5. The turbine engine of claim 1 wherein said nozzle plates comprising said concentric rings of nozzle vanes, said alternating solid rings forming circular limits of axial flow streams of said gases, a central bearing counterbore incorporated in a first and second of said nozzle plates in said direction of gas flow and a central hole having labyrinth seals in a third said nozzle plates, said vane rings having individual vanes substantially shaped according to conventional axial flow nozzle design, said nozzle vane rings radially aligned with said turbine blade rings in said turbine wheels and discharging a plurality of annular streams of said gases therein, said nozzle plates also incorporating annular bypass openings for spent gases, the number of said nozzle plates equal to the number of gas flow streams from said distributor plate;

each said turbine wheel coaxially juxtaposed downstream of each said nozzle plate and comprising a different number of said concentric and annular rings of turbine blades terminated radially by solid rings forming passages of flow streams, said turbine blade rings having substantially conventional axial flow individual blade design, the number of said turbine blade concentric rings in first said turbine wheel in the direction of said gas flow equal to the number of said valve plate openings required for each combustion cycle, the number of said turbine blade concentric rings decreasing by one in each succeeding said turbine wheel in the direction of flow, one or more said turbine wheel balanced assemblies securely fastened to said main shaft and remaining said assemblies secured to said output shaft as determined by position and needs of power division, said turbine wheels having an outer solid circumferential ring contacting labyrinth seals secured in a stationary position, said multiple concentric rings of turbine blades forming a continuously expanding flow cross-section in the direction of gases flowing coaxially toward an exhaust pipe.

6. The turbine engine of claim 1 wherein the turbine arrangement is selected from the group consisting of conventionally defined arrangements of a single spool, a multi-spool having a direct drive shaft, and free power turbines having a main shaft and a separate shaft for power output.

7. A gas turbine engine having a housing, air compressor, bearings, seals, fuel system, ignition system, and starter; the improvements juxtaposed coaxially in a direction of gas flow and in the following order comprising:

(a) a combustor air charging means, intermittently isolating and supplying compressed air for combustion from an air chamber supplied by said air compressor; said air charging means accommodating said ignition system, (b) a combustion means utilizing said compressed air from said combustor air charging means in combination with said fuel system using fuel injectors and said ignition system in multiple combustion chambers, said combustion means having rotational motion relative to inlet and outlet control means and providing a constant volume combustion source of hot pressurized streams of gases;

(c) a gas metering means intermittently sealing said combustion means in cooperation with said air charging means thereby controlling constant volume combustion and separating said gases received from said combustion means into a plurality of simultaneous flow streams;

(d) a gas distributing means receiving concentrated streams of said gases from said gas metering means and spreading said gases into multiple coaxial and annular streams of said gas;

(e) a gas acceleration means having plural nozzle plates having multiple concentric nozzle vane rings alternating with solid rings, an upstream of said nozzle plates incorporating three or more concentric rings of nozzle vanes alternating with concentric solid rings, each following of said nozzle plates incorporating one less of said concentric nozzle vane rings, said acceleration means receiving said annular gas streams from said distributing means and releasing said streams at substantially acoustic velocity;

(f) a gas energy conversion means generating rotational power by said high velocity streams flowing through multiple concentric rings of axial flow turbine blades installed in a plurality of turbine wheels driving ancillaries and an output shaft; said turbine wheels being interposed between adjacent nozzles plates, and the number of turbine blade rings in said turbine wheels equal to the number of matched vane rings in each said nozzle plate preceding each said turbine wheel receiving said gases from said nozzle plates, said housing containing all improvements integrated with said turbine components in a manner providing a low pressure loss functioning device, whereby said gas turbine utilizing said improvements converts energy of constant volume combustion into rotational power.

8. The turbine engine of claim 7 wherein said combustion air charging means comprising a stationary circular flat plate having a round clearance hole for shafts and said flat plate having elongated openings with an elongated dimension extending in a radial direction and equal in length to a combustion chambers radial dimension, an inlet plate opening minimum dimension being less than a width of a combustion means interfacing flat land between said combustion chambers facilitating sealing of said chambers, said openings angular location and number thereof establishing the duration and number of combustion cycles produced by each said combustion chamber during one revolution of said combustion means, said inlet plate providing a smooth sealing surface for intermittently sealing the inlet end of said combustion chambers, said inlet plate incorporating circular labyrinth seals for sealing a side facing said combustion means, said inlet plate incorporating one or more threaded holes for securing ignitors extending through said inlet plate, said ignitor communicating with a combustible mixture in said combustion chambers;

said combustion means comprising a cylindrically shaped rotor having flat and parallel ends, said rotor diameter in the range of 2 to 9 times a distance between rotor ends, a means for securing the rotor to a combustor shaft that is hollow and coaxial with a main shaft, said rotor having a smooth and polished periphery continuously in contact with two sets of stationary labyrinth seals supported by said housing, said rotor having flat and straight lands between said combustion chambers on both ends of said rotor, said lands of sufficient width to provide sealing functions in cooperation with adjacent flat surfaces, said combustion chambers substantially triangular in section transverse to said combustor shaft and having a truncated apex toward said shaft center with fillets at planar junctions, said chambers arranged at equal distances from said combustor shafts center and said combustion chambers having walls extending a length of said rotor, said combustor having a conical opening for fuel injection from said fuel system into each said combustion chamber as said rotor periphery passes the injectors.

9. The turbine engine of claim 7 wherein a gear reduction means comprising two driving worm gears, two driven worm gears and a set of helical gears arranged on gear shafts with said bearings supported in said housing, said gear shafts juxtaposed with a main shaft and a hollow combustion means drive shaft, said main shaft fitted with one of said driving worm gears, and said combustor drive shaft fitted with the final drive helical gear, said main shaft positioned inside of said hollow combustor shaft with both ends extending beyond thereof, said turbine wheels fixed to one end and said compressor fixed to an opposite end of said main shaft, said gears converting high speed rotational motion of said main shaft at approximately 50,000 revolutions per minute to the optimum speed range of said combustor shaft at approximately 200 revolutions per minute.

10. The turbine engine of claim 7 wherein said gas metering means comprising a stationary flat and circular plate incorporating a central shaft clearance hole and a plurality of specially shaped said inlet ports arranged at angles determining cycle pressure steps, an inlet port elongation equal in length to a combustion chamber dimension in a radial direction, a valve plate opening minimum dimension being less than a width of a flat land between said combustion chambers to facilitate sealing of said chambers, each said valve plate passage having a substantially rectangular and arcuate exit area positioned with a longest dimension in circumferential direction and communicating with a matching annular opening in said distributor plate on a downstream side, said passages having smooth internal walls which slope from inlet to outlet with minimum flow restriction, whereby the passage walls originating at and perpendicular to a small dimension of said inlet gradually diverging to terminate at a maximum dimension of said passage outlet, and the passage walls perpendicular to and originating at a maximum dimension of said passage inlet gradually converging to terminate at a minimum dimension of said outlets, said valve plate intermittently sealing a discharge side of said combustor and also providing intermittent release of separate streams of said gases to said distributor plate, the number of said passages equal to the number of pressure steps required for said gas energy utilization;

said distribution means comprising stationary rings of various diameters which are transverse to the direction of gas flow and having smaller said rings placed concentrically in a next larger ring, said rings having flat and parallel sides, a distance between said sides being equal in all rings, said rings attached to one another with radial struts to form a one piece flat plate having a tandem counterbore for shaft bearings, said rings also sized and spaced to form converging coaxial and annular flow passages between them connecting said valve plate openings with said nozzle plate, the number of said annular flow passages equal to the number of flow streams received from said valve plate, said annular flow passage exit areas exactly coinciding with the said nozzle plate blade rings, said distribution plate solid ring flat surfaces transverse to said gas flow for sealing gas leakage in cooperation with juxtaposed component flat surfaces.

11. The turbine engine of claim 7 wherein said gas acceleration means comprising multiple stationary flat and circular plates having concentric rings of nozzle vanes, said alternating solid rings forming circular limits of axial flow streams of said gases, a central bearing counterbore incorporated in a first and second of said nozzle plates in said direction of gas flow and a central clearance hole having labyrinth seals in a third of said nozzle plates, said vane rings having individual vanes substantially shaped according to conventional axial flow nozzle design, said nozzle vane rings radially aligned with said turbine blade rings in said turbine wheels and discharging a plurality of annular streams of said gases therein, said nozzle plates also incorporating annular bypass openings for spent gases, the number of said nozzle plates equal to the number of gas flow streams from said distributor plate;

said energy conversion means, coaxially juxtaposed downstream of paired nozzle plates, comprising substantially flat turbine blade wheels with means for attaching said wheels to said turbine shafts, each said turbine wheel having a different number of said concentric and annular rings of turbine blades terminated radially by solid rings forming passages of flow streams, said turbine blade rings having substantially conventional axial flow individual blade design, the number of said turbine blade concentric rings in first said turbine wheel in the direction of said gas flow equal to the number of said valve plate openings required for each combustion cycle, the number of said turbine blade concentric rings decreasing by one in each succeeding said turbine wheel in the direction of flow, one or more said turbine wheel balanced assemblies securely fastened to said main shaft and remaining said assemblies secured to said output shaft as determined by position and needs of power division, said turbine wheels having an outer solid circumferential ring contacting labyrinth seals secured in a stationary position, said multiple concentric rings of turbine blades forming continuously expanding flow cross-sections in the direction of gases flowing coaxially toward an exhaust pipe.

* * * * *

UNITED STATES PATENT AND TRADEMARK OFFICE
CERTIFICATE OF CORRECTION

PATENT      : 5, 960,625
DATED       : October 5, 1999
INVENTOR(S) : Edward H. Zdvorak It is certified that error appears in the above-identified patent and that said Letters Patent is hereby corrected as shown below:

The title page, showing the illustrative figure, should be deleted and substitute therefor the attached title page.

Drawing Sheets 1-11 should be deleted and substitute therefor Drawing Sheets 1-11, as shown on the attached pages.

Signed and Sealed this

First Day of February, 2000

*Attest:*

*Attesting Officer*

Q. TODD DICKINSON

*Acting Commissioner of Patents and Trademarks*

United States Patent [19]
Zdvorak, Sr.

[11] Patent Number: 5,960,625
[45] Date of Patent: Oct. 5, 1999

[54] CONSTANT VOLUME COMBUSTION TURBINE WITH PLURALITY FLOW TURBINE WHEELS

[76] Inventor: Edward H. Zdvorak, Sr., 8024 Rancho Fanita Dr., Santee, Calif. 92071

[21] Appl. No.: 09/137,623

[22] Filed: Aug. 21, 1998

[51] Int. Cl.$^6$ .................. F02C 3/16; F02C 5/00
[52] U.S. Cl. .................. 60/39.34; 60/39.38
[58] Field of Search .................. 60/39.34, 39.35, 60/39.38, 39.76, 247

[56] References Cited

U.S. PATENT DOCUMENTS

| | | | |
|---|---|---|---|
| 736,715 | 8/1903 | Gervais | 60/39.76 |
| 2,937,498 | 5/1960 | Schmidt | 60/39.38 |
| 3,417,564 | 12/1968 | Call | 60/39.38 |
| 3,611,720 | 10/1971 | Fehlau | 60/39.34 |
| 3,791,139 | 2/1974 | Simons | |
| 3,811,275 | 5/1974 | Mastrobuono | 60/39.34 |
| 4,241,576 | 12/1980 | Gertz | 60/39.34 |
| 4,570,438 | 2/1986 | Lorenz | |
| 4,620,414 | 11/1986 | Christ | 60/39.34 |
| 4,693,075 | 9/1987 | Sabatiuk | |
| 5,237,811 | 8/1993 | Stockwell | |

FOREIGN PATENT DOCUMENTS 1113611  9/1961  German Dem. Rep.

Primary Examiner—Ted Kim

[57] ABSTRACT

A gas turbine engine having a turbine housing, air compressor, diffuser, shafts, bearings, seals, ignition system, fuel system and starter with improvements comprising an air charge combustor inlet plate (44), a rotating constant volume combustor (74), a gas metering valve plate (46), a gas distributor plate (102), gas nozzle plates (48), (104) and (112), and turbine wheels (66), (68) and (70); which enables changing pressures inherent to constant volume combustion, in combustion chambers (74E)–(74T), to simultaneously produce a plurality of initially separate, coaxial and annular, virtually continuous gas flow streams for efficiently converting combustion gas energy into useful work. The combustor (74), rotating very slowly relative to the speed of the main turbine shaft, with individual combustion chambers (74E)–(74T) equally spaced circumferentially about the center of rotation, provides sufficient time for complete combustion, supplying gas metering valve plate (46) and gas distributor plate (102) with gases at predetermined pressure steps for a high production rate of high frequency, coaxial, annular gas streams driving turbine wheels (66), (68) and (70) juxtaposed coaxially with paired nozzles plates (48), (104) and (112). The turbine wheels and the nozzle plates incorporate conventional axial flow blades and nozzle vane air foils, but said vanes and blades are arranged in a plurality of radially displaced concentric patterns with circular separators for accommodating a plurality of annular gas streams. After passing through the nozzle plates and the turbine wheels, spent gas streams merge into predetermined equal temperature, equal pressure and equal velocity confluence zones and exhaust to atmosphere. The turbine assembly provides short and smooth passages for the air and gas processes. Alternate embodiments include a different number of turbine wheels and nozzle plates, and other embodiments incorporate optional features similar to existing technology equipment and heat recovery cycles.

11 Claims, 11 Drawing Sheets